(12) United States Patent
Lee

(10) Patent No.: US 10,886,793 B2
(45) Date of Patent: Jan. 5, 2021

(54) ELECTRONIC DEVICE, AND METHOD FOR ELECTRONIC DEVICE PROVIDING USER INTERFACE

(71) Applicant: SAMSUNG ELECTRONICS CO., LTD., Suwon-si (KR)

(72) Inventor: Kyu-sung Lee, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 324 days.

(21) Appl. No.: 15/769,001

(22) PCT Filed: Aug. 24, 2016

(86) PCT No.: PCT/KR2016/009359
§ 371 (c)(1),
(2) Date: Apr. 17, 2018

(87) PCT Pub. No.: WO2017/099331
PCT Pub. Date: Jun. 15, 2017

(65) Prior Publication Data
US 2018/0323660 A1 Nov. 8, 2018

(30) Foreign Application Priority Data
Dec. 9, 2015 (KR) .......................... 10-2015-0175348

(51) Int. Cl.
*H02J 50/90* (2016.01)
*H02J 50/12* (2016.01)
(Continued)

(52) U.S. Cl.
CPC ............ *H02J 50/90* (2016.02); *G06K 9/3208* (2013.01); *H02J 7/025* (2013.01); *H02J 50/12* (2016.02);
(Continued)

(58) Field of Classification Search
CPC ...................................................... H02J 50/90
See application file for complete search history.

(56) References Cited

U.S. PATENT DOCUMENTS

| 8,143,746 B2 | 3/2012 | Marzetta et al. |
| 8,384,247 B2 | 2/2013 | Yerazunis et al. |

(Continued)

FOREIGN PATENT DOCUMENTS

| KR | 10-2013-0048407 | 5/2013 |
| KR | 10-1257676 | 5/2013 |

(Continued)

OTHER PUBLICATIONS

International Search Report and Written Opinion of the International Searching Authority dated Dec. 8, 2016 in International Patent Application No. PCT/KR2016009359.

*Primary Examiner* — Daniel Kessie
(74) *Attorney, Agent, or Firm* — Staas & Halsey, LLP

(57) ABSTRACT

Provided is an electronic device including: a wireless power receiver configured to receive wireless power from a wireless power transmission device; and a controller configured to obtain a reception ratio of wireless power received by the wireless power receiver relative to wireless power transmitted by the wireless power transmission device, and provide a user interface that guides a location movement of the wireless power transmission device, based on the obtained reception ratio.

17 Claims, 17 Drawing Sheets

(51) Int. Cl.
*G06K 9/32* (2006.01)
*H02J 7/02* (2016.01)
*G06K 9/00* (2006.01)

(52) U.S. Cl.
CPC . *G06K 9/00664* (2013.01); *G06K 2009/3225* (2013.01)

(56) References Cited

U.S. PATENT DOCUMENTS

| | | | | |
|---|---|---|---|---|
| 2013/0082540 | A1* | 4/2013 | Christ | H04B 5/0012 307/109 |
| 2014/0354063 | A1 | 12/2014 | Leabman et al. | |
| 2015/0145338 | A1 | 5/2015 | Gulak et al. | |
| 2016/0100124 | A1* | 4/2016 | Leabman | H04N 5/63 348/730 |
| 2020/0119595 | A1* | 4/2020 | Nakano | B60L 53/36 |

FOREIGN PATENT DOCUMENTS

| | | |
|---|---|---|
| KR | 10-2014-0132196 | 11/2014 |
| KR | 10-2014-0141964 | 12/2014 |

* cited by examiner

ELECTRONIC DEVICE, AND METHOD FOR ELECTRONIC DEVICE PROVIDING USER INTERFACE

CROSS-REFERENCE TO RELATED APPLICATIONS

This application is a National Phase Application under 35 U.S.C. § 371 of PCT International Patent Application No. PCT/KR2016/009359, filed Aug. 24, 2016 which claims the foreign priority benefit under 35 U.S.C. § 119 to Korean Patent Application No. 10-2015-0175348 filed Dec. 9, 2015, the contents of which are incorporated herein by reference.

TECHNICAL FIELD

The present disclosure relates to an electronic device and a method in which the electronic device provides a user interface.

BACKGROUND ART

In the related art, technologies mainly use power lines to receive power. However, wireless power transfer (WPT) in which power can be provided wirelessly is actively being developed at present.

In WPT, power can be provided wirelessly at anytime and anywhere without power lines. WPT is a core technology in wireless power supply and charging of electronic apparatuses, wireless power supply and charging of electric cars, remote wireless power supply, and ubiquitous wireless sensor power supply, and thus is attracting much attention as a technology that can replace an existing method of power supply and charging via electric lines.

Examples of techniques for transmitting/receiving power wirelessly include a method using electromagnetic induction at a short distance, a method using micro-wave emission, and a method using magnetic resonance.

In particular, when a wireless power transmission device transmits power from a certain distance or greater, the power reception efficiency of a wireless power reception device may vary according to an arrangement of wireless power transmission/reception devices. Accordingly, to efficiently transmit or receive wireless power, wireless power transmission/reception devices need to be appropriately arranged.

DESCRIPTION OF EMBODIMENTS

Technical Problem

Provided is an electronic device including: a wireless power receiver configured to receive wireless power from a wireless power transmission device; and a controller configured to obtain a reception ratio of wireless power received by the wireless power receiver relative to wireless power transmitted by the wireless power transmission device, and provide a user interface that guides a location movement of the wireless power transmission device, based on the obtained reception ratio.

Advantageous Effects of Disclosure

Electronic devices according to disclosed embodiments can calculate reception efficiency thereof by using the amount of wireless power received by each electronic device relative to the amount of wireless power transmitted by a wireless power transmission device.

When the calculated reception efficiency is less than a threshold, the electronic devices according to disclosed embodiments can sense a current location of the wireless power transmission device.

The electronic devices according to disclosed embodiments can determine the current location of the wireless power transmission device by analyzing the spectrum of a frequency transmitted by the wireless power transmission device.

The electronic devices according to disclosed embodiments can provide a user interface that guides a location movement of the wireless power transmission device in order to improve the reception efficiency.

BEST MODE

Figure 1:
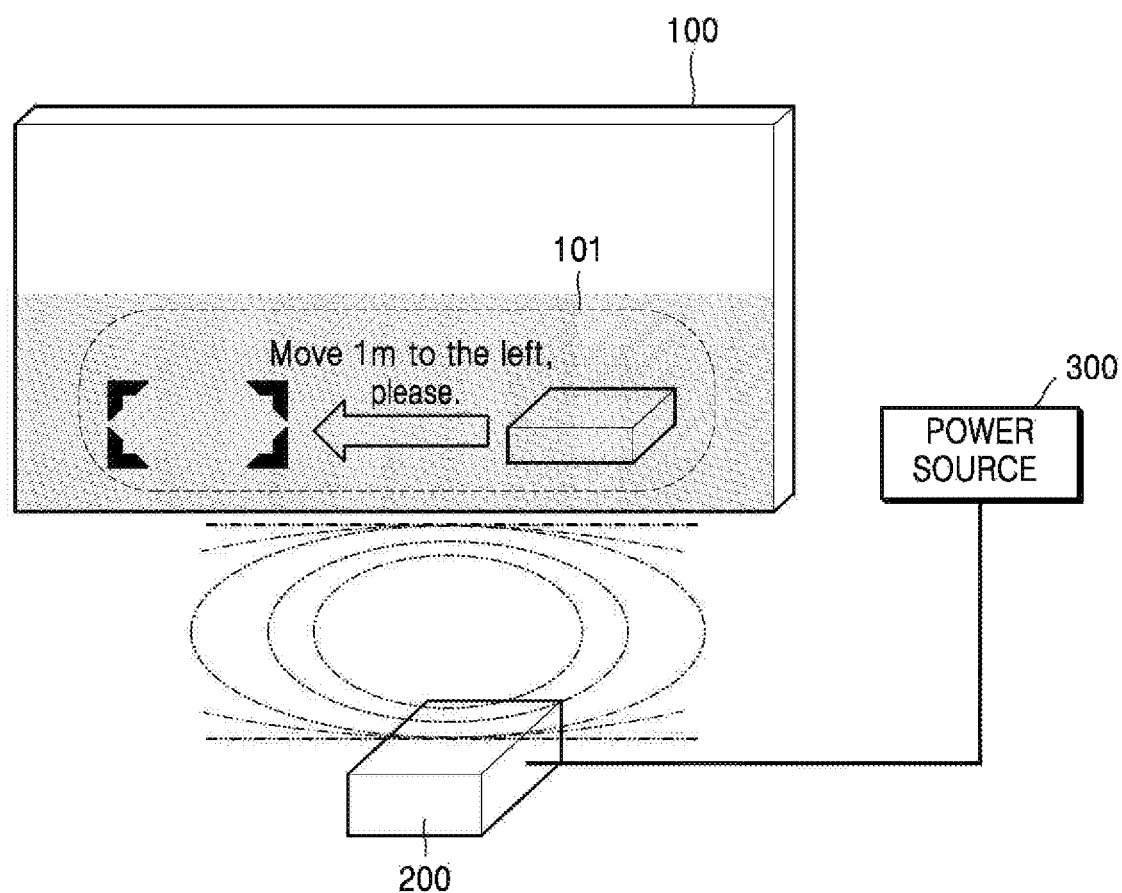
FIG. 1 is a schematic diagram of a wireless power transmission/reception system according to an embodiment.

According to an aspect of the present disclosure, there is provided an electronic device including: a wireless power receiver configured to receive wireless power from a wireless power transmission device; and a controller configured to obtain a reception ratio of wireless power received by the wireless power receiver relative to wireless power transmitted by the wireless power transmission device, and provide a user interface that guides a location movement of the wireless power transmission device, based on the obtained reception ratio.

The electronic device may further include a sensing unit configured to sense a current location of the wireless power transmission device, when the reception ratio is lower than a threshold, wherein the user interface guides the location movement of the wireless power transmission device from a current location of the wireless power transmission device to a target location that is for increasing the reception ratio.

The target location may be determined based on a spectrum of a predetermined frequency received from the wireless power transmission device.

The target location may be determined in consideration of physical objects existing in a space where the electronic device is located.

The sensing unit may include at least one image sensor, and the controller may be further configured to determine the current location and the target location of the wireless power transmission device, based on at least one image captured by the at least one image sensor.

The user interface may include at least one image for guiding a change in a location of the wireless power transmission device.

The at least one image may include at least one of an image representing a current location of the wireless power transmission device, an image representing a target location of the wireless power transmission device, and a guide image indicating a movement direction for moving the wireless power transmission device from the current location of wireless power transmission device to the target location.

The user interface may include text representing the reception ratio, and the controller may be further configured to update the reception ratio when a movement of the wireless power transmission device is sensed.

The wireless power receiver may receive, from the wireless power transmission device, information about the wireless power transmitted by the wireless power transmission device.

The wireless power transmission device may transmit electromagnetic wave energy of a predetermined frequency to the electronic device, and the wireless power receiver may receive the electromagnetic wave energy by making a frequency transmitted by the wireless power transmission device identical to a resonance frequency of the wireless power receiver.

The wireless power transmission device may be included in a sound bar that is in communication with the electronic device.

According to another aspect of the present disclosure, there is provided a method, performed by an electronic device, of providing a user interface, the method including: receiving wireless power from a wireless power transmission device; obtaining a reception ratio of wireless power received by the electronic device relative to wireless power transmitted by the wireless power transmission device; and providing a user interface that guides a location movement of the wireless power transmission device, based on the obtained reception ratio.

The providing of the user interface may include: sensing a current location of the wireless power transmission device, when the reception ratio is lower than a threshold; and providing the user interface that guides a location movement of the wireless power transmission device from the current location of the wireless power transmission device to a target location that is for increasing the reception ratio.

The target location may be determined based on a spectrum of a predetermined frequency received from the wireless power transmission device.

The target location may be determined in consideration of physical objects existing in a space where the electronic device is located.

The sensing of the current location of the wireless power transmission device may include obtaining an image captured via at least one image sensor, and determining the current location and the target location of the wireless power transmission device, based on the captured image.

The user interface may include at least one image for guiding a change in the location of the wireless power transmission device.

The at least one image may include at least one of an image representing the current location of the wireless power transmission device, an image representing the target location of the wireless power transmission device, and a guide image indicating a movement direction and a movement distance for moving the current location of the wireless power transmission device to the target location.

The user interface may include a text representing the reception ratio, and the providing of the user interface may include updating the reception ratio when a movement of the wireless power transmission device is sensed.

According to another aspect of the present disclosure, there is provided a computer-readable recording medium having recorded thereon a program for executing the above-described method.

MODE OF DISCLOSURE

Hereinafter, the terms used in the specification will be briefly described, and then the present disclosure will be described in detail.

Although general terms widely used at present were selected for describing the present disclosure in consideration of the functions thereof, these general terms may vary according to intentions of one of ordinary skill in the art, case precedents, the advent of new technologies, and the like. Terms arbitrarily selected by the applicant of the present disclosure may also be used in a specific case. In this case, their meanings need to be given in the detailed description of the present disclosure. Hence, the terms must be defined based on their meanings and the contents of the entire specification, not by simply stating the terms.

While such terms as "first", "second", etc., may be used to describe various components, such components must not be limited to the above terms. The terms first and second should not be used to attach any order of importance but are used to distinguish one element from another element. For example, a first component discussed below could be termed a second component, and similarly, a second component may be termed a first component without departing from the teachings of the present disclosure. The term "and/or" includes any and all combinations of one or more of the associated listed items.

The terms "comprises" and/or "comprising" or "includes" and/or "including" when used in this specification, specify the presence of stated elements, but do not preclude the presence or addition of one or more other elements. Also, the term 'unit' in the embodiments of the present disclosure means a software component, or a hardware component (such as, a field-programmable gate array (FPGA) or an application-specific integrated circuit (ASIC)), and performs a specific function. However, the term "unit" is not limited to software or hardware. The term "unit" may be configured to be included in an addressable storage medium or to reproduce one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Embodiments of the present disclosure are described in detail herein with reference to the accompanying drawings so that this disclosure may be easily performed by one of ordinary skill in the art to which the present disclosure pertain. The present disclosure may, however, be embodied in many different forms and should not be construed as being limited to the embodiments set forth herein. In the drawings, parts irrelevant to the description are omitted for simplicity of explanation, and like numbers refer to like elements throughout.

FIG. 1 is a schematic diagram of a wireless power transmission/reception system according to an embodiment. Referring to FIG. 1, the wireless power transmission/reception system includes an electronic device 100, a wireless power transmission device 200, and a power source 300.

The electronic device 100 may receive wireless power from the wireless power transmission device 200. For example, the electronic device 100 may be a display device including an analog TV, a digital TV, a three-dimensional (3D) TV, a smart TV, an LED TV, an OLED TV, a plasma TV, a monitor, or the like, or may be any of various computing devices (e.g., a computer, an electronic frame, a navigation device, and a PDA) capable of providing a user interface, but it will be easily understood by one of ordinary skill in the art to which the present disclosure pertains that embodiments of the present disclosure are not limited thereto.

The wireless power transmission device 200 may receive power from the power source 300 and may transmit the power to the electronic device 100 located a certain distance away therefrom. For example, the wireless power transmission device 200 may convert the power received from the power source 300 into electromagnetic wave energy of a predetermined frequency (or at least one frequency) and may transmit the electromagnetic wave energy to the electronic device 100.

The wireless power transmission device 200 may be implemented in a combined form with another device. For example, the wireless power transmission device 200 may be implemented in a combined form with a sound bar, a set-top box (STB), an IP STP, a digital broadcasting receiver, or the like. The wireless power transmission device 200 may be implemented in a combined form with an input/output (I/O) device connected, by wires or wirelessly, with various types of external sources (such as, an antenna cable, a STB, and a media player) and the electronic device 100.

According to embodiments, the electronic device 100 may monitor the amount of power received from the wireless power transmission device 200. The electronic device 100 may receive from the wireless power transmission device 200 information about the amount of power transmitted by the wireless power transmission device 200. For example, the wireless power transmission device 200 may transmit information about a power amount to the electronic device 100 by using a short-range wireless communication technique, such as Bluetooth, near field communication (NFC), or infrared.

The electronic device 100 may calculate reception efficiency (%) thereof by using the amount of wireless power received by the electronic device 100 relative to the amount of wireless power transmitted by the wireless power transmission device 200. When the calculated reception efficiency is less than a threshold (e.g., 80%), the electronic device 100 may sense a current location of the wireless power transmission device 200. For example, the electronic device 100 may determine the current location of the wireless power transmission device 200 by analyzing the spectrum of a frequency transmitted by the wireless power transmission device 200.

The electronic device 100 may provide a user interface that guides a location movement of the wireless power transmission device 200 in order to improve the reception efficiency. For example, the electronic device 100 may provide a visual user interface 101 instructing the wireless power transmission device 200 to move 1 m to the left. Alternatively, the electronic device 100 may provide an auditory user interface instructing the wireless power transmission device 200 to move 1 m to the left. Alternatively, the electronic device 100 may provide both the visual user interface 101 and the auditory user interface, but embodiments are not limited thereto.

Although it has been described above that the electronic device 100 provides a user interface that guides a location movement of the wireless power transmission device 200, it will be understood by one of ordinary skill in the art that the electronic device 100 may provide a user interface that guides a location movement of the electronic device 100.

As such, by providing a user interface that guides a location movement of the wireless power transmission device 200 or the electronic device 100, the wireless power transmission/reception system may induce easy improvements in wireless power transmission/reception efficiency. Moreover, the wireless power transmission/reception system may reduce the amount of power consumption by improving the wireless power transmission/reception efficiency.

Figure 2A:
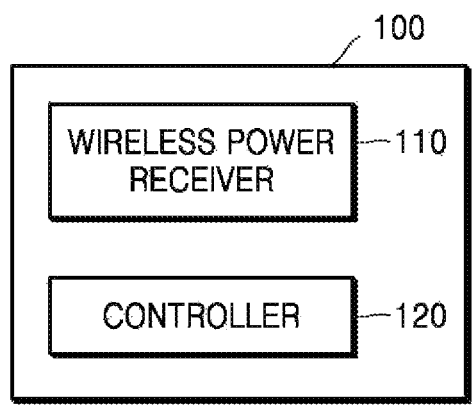
FIG. 2A is a block diagram of a configuration of an electronic device according to an embodiment.

FIG. 2A is a block diagram of a structure of an electronic device according to an embodiment.

Referring to FIG. 2A, the electronic device 100 includes a wireless power receiver 110 and a controller 120.

The wireless power receiver 110 may receive wireless power from the wireless power transmission device 200. For example, the wireless power receiver 110 may receive electromagnetic wave energy from the wireless power transmission device 200 by adjusting the frequency transmitted by the wireless power transmission device 200 and a resonance frequency or a lamor frequency of the wireless power receiver 110.

For example, the wireless power receiver 110 may include a magnet (not shown) and at least one resonance coil (not shown). The resonance coil may have a spiral structure or a helical structure, but embodiments of the present disclosure are not limited thereto. The resonance coil may be formed of a predetermined material including proton, and the magnet may generate a magnetic field by rotating the proton included in the resonance coil. The wireless power receiver 110 may adjust a resonance frequency of the proton included in the resonance coil, by adjusting the magnet density of the magnet. Accordingly, the wireless power receiver 110 may obtain electromagnetic wave energy of the wireless power transmission device 200 via magnetic coupling with the wireless power transmission device 200 by adjusting the magnet density of the magnet.

The wireless power receiver 110 may include a capacitor (not shown) for charging the electromagnetic wave energy received from the wireless power transmission device 200. However, disclosed embodiments are not limited to the above-described wireless power receiving method of the wireless power receiver 110, and it will be understood by one of ordinary skill in the art that wireless power may be received using any of the other wireless power receiving methods (for example, an electromagnetic induction method and an electromagnetic wave method).

The wireless power receiver 110 may be located on a bezel of the electronic device 100. Alternatively, the wireless power receiver 110 may be located on a front side or rear side of the electronic device 100, and may protrude from a portion of the electronic device 100.

Figure 3A:
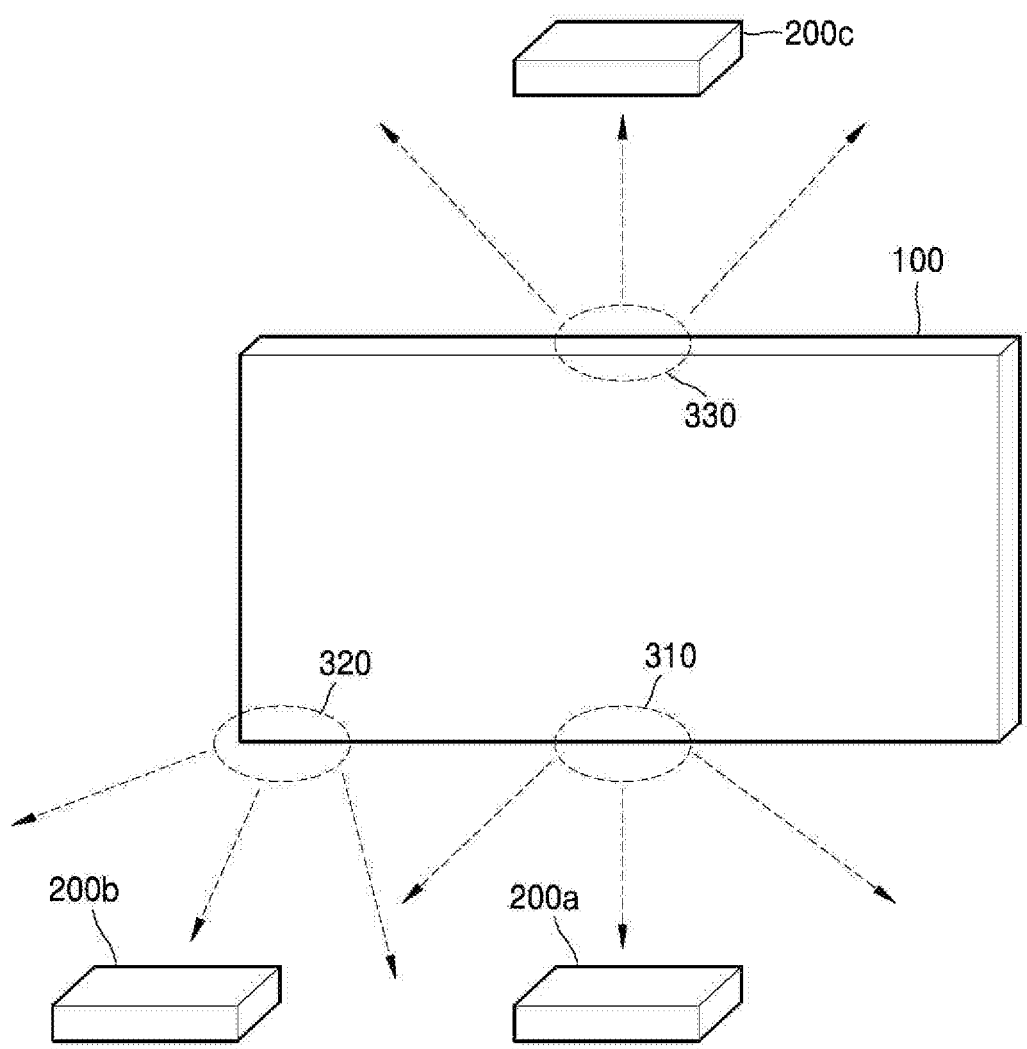
FIGS. 3A and 3B illustrate examples of a location of a wireless power receiver 110.
Figure 3B:
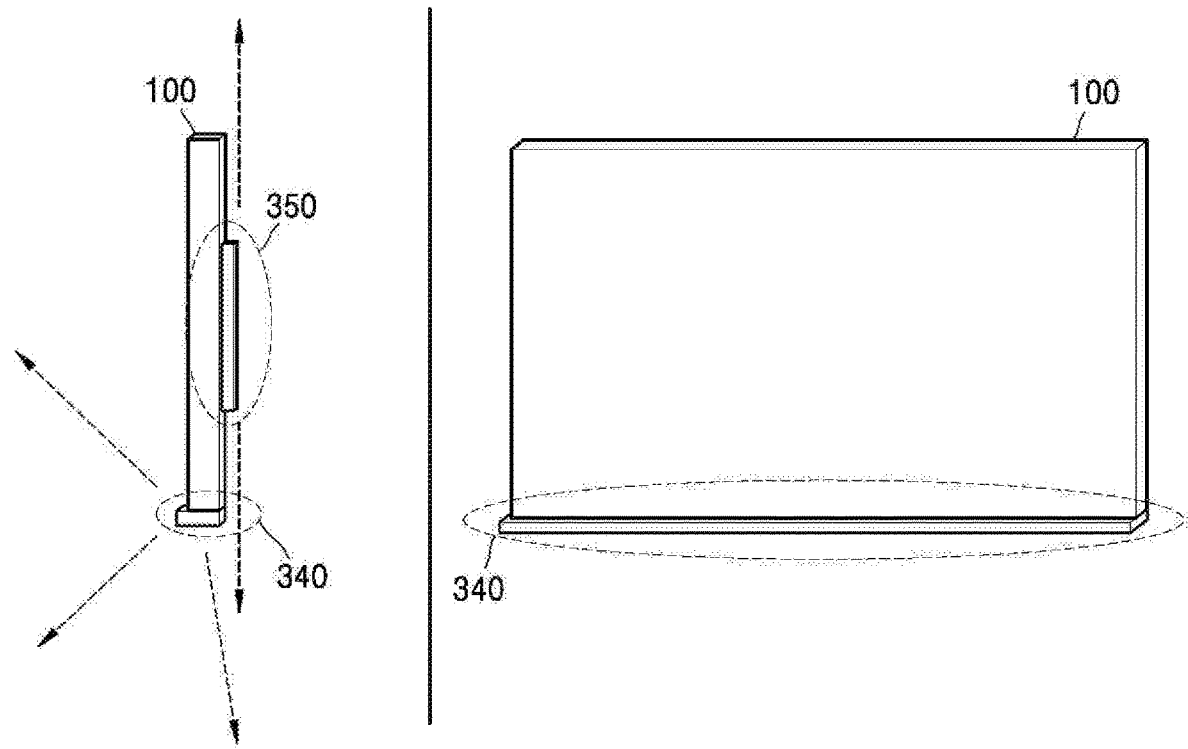

FIGS. 3A and 3B illustrate examples of a location of the wireless power receiver 110. It is assumed that the electronic device 100 is a display device, such as a TV or a smart TV.

Referring to FIG. 3A, the wireless power receiver 110 may be located on a bezel of the electronic device 100. For example, the wireless power receiver 110 may be located on a bottom bezel 310, a side bezel 320, and a top bezel 330 of the electronic device 100. In this case, only when wireless power transmission devices 200a, 200b, and 200c are located within a certain range, the wireless power receiver 110 may obtain wireless power at a wireless power reception ratio that is equal to or greater than a threshold (for example, 80%).

Alternatively, referring to FIG. 3B, the wireless power receiver 110 may be located on a bottom protrusion 340 or a rear side 350 of the electronic device 100. The left side of FIG. 3B illustrates a lateral side of the electronic device 100, and the right side thereof illustrates a front side of the electronic device 100. However, embodiments of the present disclosure are not limited thereto, and a plurality of wireless power receivers 110 may be located in the electronic device 100. The wireless power receiver 110 may be located outside the electronic device 100 and connected with the electronic device 100 by wire.

The controller 120 may control overall operations of the electronic device 100. For example, the controller 120 may control the components of the electronic device 100 including the wireless power receiver 110.

The controller 120 may monitor the amount of wireless power received by the wireless power receiver 110.

The controller 120 may calculate a reception ratio of the amount of wireless power received by the wireless power receiver 110 relative to the amount of wireless power transmitted by the wireless power transmission device 200. In this case, the amount of wireless power transmitted by the wireless power transmission device 200 may be a fixed value and may be previously stored in the electronic device 100. Alternatively, the controller 120 may obtain information about the amount of wireless power transmitted by the wireless power transmission device 200, via a communicator 1250 of FIG. 12.

The controller 120 may provide a user interface that guides a location movement of the wireless power transmission device, based on the reception ratio. For example, the controller 120 may provide, to the entirety or a portion of a screen of the electronic device 100, a visual user interface instructing movement of the wireless power transmission device 200. Alternatively, the controller 120 may provide an auditory user interface via a speaker included inside or outside the electronic device 100, or may provide visual and auditory user interfaces.

The controller 120 may generate a user interface including at least one image for guiding a location change of the wireless power transmission device 200. In detail, the controller 120 may generate a user interface including at least one image that represents a recommended location for increasing the reception ratio. The recommended location may include information about at least one experimentally predetermined location. For example, the recommended location may include information about a critical distance (for example, within 2 m) and a critical angle (for example, within 30°) from the wireless power receiver 110. When the electronic device 100 receives wireless power at a reception ratio equal to or greater than a threshold, the recommended locations may include information indicating a location of the wireless power transmission device 200.

The controller 120 may provide a user interface that guides a location movement from the current location of the wireless power transmission device 200 to a target location. Operations of the electronic device 100 sensing the current location of the wireless power transmission device 200 and determining the target location under the control of the controller 120 will be described later in detail with reference to FIG. 2B.

The controller 120 may generate a user interface including a text representing a wireless power reception ratio. The wireless power reception ratio may be updated as the wireless power transmission device 200 moves. The controller 120 may provide a user interface including the above-described at least one image and a text representing a reception ratio.

When the wireless power reception ratio from the wireless power transmission device 200 becomes less than a threshold (for example, 80%), the controller 120 may automatically execute the user interface. For example, the controller 120 may interrupt execution of an application or a program and may automatically execute a user interface for guiding a location movement of the wireless power transmission device 200.

Alternatively, when a movement (for example, a movement by a user) of the wireless power transmission device 200 is sensed, the controller 120 may automatically provide a user interface in order to guide the wireless power transmission device 200 to move to an appropriate location.

When the reception ratio becomes greater than the threshold as the wireless power transmission device 200 is moved, the controller 120 may terminate the user interface. The controller 120 may terminate the user interface and may re-execute an application (or a program) that was previously executed.

Although it has been described above that the electronic device 100 provides a user interface for guiding a location movement of the wireless power transmission device 200, embodiments are not limited thereto. The electronic device 100 may provide a user interface for guiding a location movement of the electronic device 100. In this case, the electronic device 100 may provide a user interface that guides a location movement from the current location of the electronic device 100 to the target location.

Figure 2B:
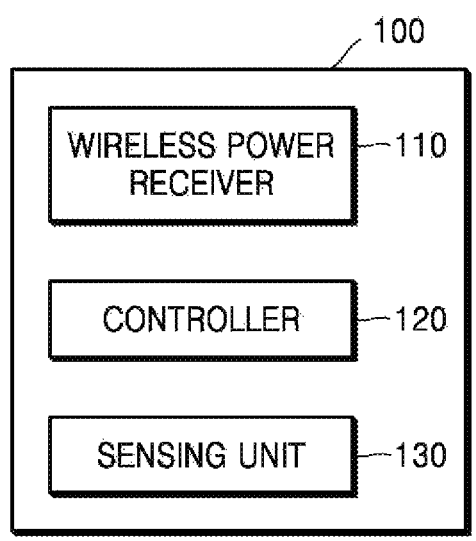
FIG. 2B is a block diagram of a configuration of an electronic device according to another embodiment.

FIG. 2B is a block diagram of a structure of the electronic device 100, according to another embodiment.

Referring to FIG. 2B, the electronic device 100 may further include a sensing unit 130 in addition to the wireless power receiver 110 and the controller 120. The operations of the wireless power receiver 110 and the controller 120 have been described above, and thus repeated descriptions thereof will be omitted.

The sensing unit 130 may sense the current location of the wireless power transmission device 200. For example, the sensing unit 130 may include at least one of a magnetic field sensor (not shown), an image sensor (not shown), a temperature/humidity sensor (not shown), an infrared sensor (not shown), and a proximity sensor (not shown).

For example, when the sensing unit 130 includes a magnetic field sensor or a hall sensor, the sensing unit 130 may sense the strength of a magnetic field around the electronic device 100. In detail, the sensing unit 130 may obtain a frequency spectrum of a magnetic field including a predetermined frequency that is transmitted by the wireless power transmission device 200 to provide wireless power.

Figure 4:
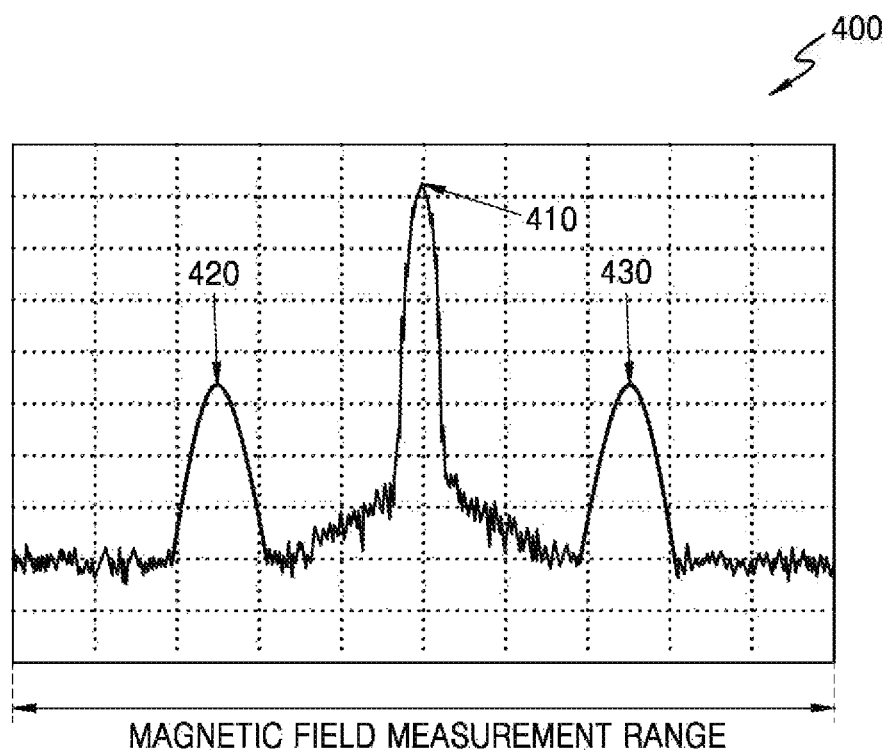
FIG. 4 illustrates a frequency spectrum of a magnetic field obtained by a sensing unit 130.

FIG. 4 illustrates the frequency spectrum of the magnetic field obtained by the sensing unit 130. As shown in FIG. 4, a spectrum 400 obtained by the sensing unit 130 may include a first point 410 where the magnetic field has a largest strength. In this case, the sensing unit 130 may determine the first point 410 to be a point where a center of the wireless power transmission device 200 is located. The sensing unit 130 may determine a second point 420 and a third point 430, where the strength of the magnetic field is less than at the first point 410 and greater than the other points, to be points where both ends of the wireless power transmission device 200 are located. As such, the electronic device 100 may sense the current location of the wireless power transmission device 200 and a size of the wireless power transmission device 200 by using a change in the strength of the magnetic field sensed by the sensing unit 130.

The sensing unit 130 may identify the predetermined frequency of the wireless power transmission device 200 from the obtained frequency spectrum of the magnetic field. In this case, information about the predetermined frequency transmitted by the wireless power transmission device 200 may be pre-registered in the electronic device 100.

Alternatively, when the sensing unit 130 includes an image sensor (for example, a CMOS sensor), the sensing unit 130 may sense the current location of the wireless power transmission device 200, based on an image captured by the image sensor. For example, the sensing unit 130 may provide the captured image to the controller 120, and the controller 120 may determine whether objects included in the received image include an object identical with an image of the wireless power transmission device 200 pre-stored in the electronic device 100.

Alternatively, when the sensing unit 130 includes a temperature/humidity sensor, the sensing unit 130 may sense the current location of the wireless power transmission device 200 by sensing heat emitted by the wireless power transmission device 200.

Alternatively, when the sensing unit 130 includes a proximity sensor, the sensing unit 130 may sense devices located within a certain range from the electronic device 100. In this case, the electronic device 100 may request the sensed devices for identity (ID) values via the communicator 1250 of FIG. 12 and may receive the ID values from the sensed devices. When the received ID values include an ID value of the wireless power transmission device 200, the controller 120 may calculate the current location of the wireless power transmission device 200.

The sensing unit 130 may include a plurality of sensors. For example, the sensing unit 130 may include a magnetic field sensor and an image sensor. When the frequency received from the wireless power transmission device 200 has a weak intensity, the sensing unit 130 may activate the image sensor. For example, when the wireless power transmission device 200 is hidden by another object or the intensity of the predetermined frequency transmitted by the wireless power transmission device 200 is weakened by another object, the sensing unit 130 may activate the image sensor.

The sensing unit 130 may be located close to the wireless power receiver 110. For example, the sensing unit 130 may be located on a bottom bezel of the electronic device 100 at a short distance from the wireless power receiver 110 or sensing units 130 may be located on left and right bezels of the electronic device 100. However, embodiments of the present disclosure are not limited thereto. For example, the sensing unit 130 may be located on a front or rear side of the electronic device 100.

Alternatively, the sensing unit 130 may be located apart from the wireless power receiver 110. In this case, the controller 120 may calculate a current location and a target location for moving a location of the wireless power transmission device 200, in consideration of locations where the wireless power receiver 110 and the sensing unit 130 are arranged.

According to embodiments, the electronic device 100 may not include the sensing unit 130. In this case, the wireless power receiver 110 may sense the current location of the wireless power transmission device 200. In detail, the wireless power receiver 110 may sense the current location of the wireless power transmission device 200 by analyzing a frequency spectrum of the magnetic field formed in the resonance coil (not shown).

As described above, the controller 120 may calculate a reception ratio of the amount of wireless power received by the wireless power receiver 110 relative to the amount of wireless power transmitted by the wireless power transmission device 200. When the reception ratio is lower than the threshold, the controller 120 may activate the sensing unit 130 to sense the current location of the wireless power transmission device 200. The controller 120 may determine the current location of the wireless power transmission device 200 by analyzing the frequency spectrum of the magnetic field obtained by the sensing unit 130 and/or the captured image.

For example, referring to FIGS. 3A and 4, when the wireless power receiver 110 and the sensing unit 130 are located on the bottom bezel 310 of the electronic device 100, the controller 120 may determine a location of the wireless power transmission device 200a, based on the spectrum 400 of the frequency of the magnetic field sensed by the sensing unit 130. The controller 120 may determine that the wireless power transmission device 200a is located on a straight line perpendicular to a center of the wireless power receiver 110.

The controller 120 may provide a user interface that guides a location movement from the current location of the wireless power transmission device 200 to a target location for increasing the reception ratio. The target location may be a location that enables the wireless power reception ratio from the wireless power transmission device 200 to be equal to or greater than the threshold (for example, 80%), and may be determined by the spectrum of the frequency of the magnetic field sensed by the sensing unit 130. For example, the controller 120 may select a recommended location at a short distance from the current location of the wireless power transmission device 200, from among recommended locations pre-stored in the electronic device 100, as the target location, based on the frequency spectrum of the magnetic field obtained by the sensing unit 130. The recommended location may include information about at least one experimentally predetermined location. For example, the recommended location may include information about a critical distance (for example, within 2 m) and a critical angle (for example, within 30°) from the wireless power receiver 110. When the electronic device 100 receives wireless power at a reception ratio equal to or greater than a threshold, the recommended locations may include information indicating a location of the wireless power transmission device 200.

Alternatively, the controller 120 may determine one recommended location close to the wireless power transmission device 200, from among a plurality of recommended locations, as the target location, based on an image captured by an image sensor.

The target location may be determined considering physical objects existing in a space where the electronic device 100 is located. For example, the controller 120 may identify physical objects (for example, a sofa, a table, and a sound bar) located around the wireless power transmission device 200, by analyzing different frequency components included in the frequency spectrum of the magnetic field obtained by the sensing unit 130. Alternatively, the controller 120 may identify the physical objects existing in the space where the electronic device 100 is located, based on the image captured by the sensing unit 130. The controller 120 may correct the target location in consideration of the physical objects. For example, when a table exists at the target location, the controller 120 may correct the target location to above the table.

The controller 120 may generate a user interface that guides a location movement from the current location of the wireless power transmission device 200 to the target location. For example, the controller 120 may generate a user interface including at least one image for guiding a change in a location of the wireless power transmission device 200. In detail, the controller 120 may generate a user interface including at least one of an image representing the current location of the wireless power transmission device 200, an image representing the target location of the wireless power transmission device 200, and a guide image indicating a movement direction for moving the current location of the wireless power transmission device 200 to the target location.

The controller 120 may generate a user interface including a text representing a wireless power reception ratio. The wireless power reception ratio may be updated as the wireless power transmission device 200 moves. The controller 120 may provide a user interface including the above-described at least one image and a text representing a reception ratio.

When the wireless power reception ratio from the wireless power transmission device 200 becomes less than a threshold, the controller 120 may automatically execute the user interface. For example, the controller 120 may interrupt execution of an application or a program and may automatically execute a user interface for guiding a location movement of the wireless power transmission device 200.

When the wireless power transmission device 200 is moved to the target location, the controller 120 may terminate the user interface. The controller 120 may terminate the user interface and may re-execute an application (or a program) that has previously been executed.

Figure 5:
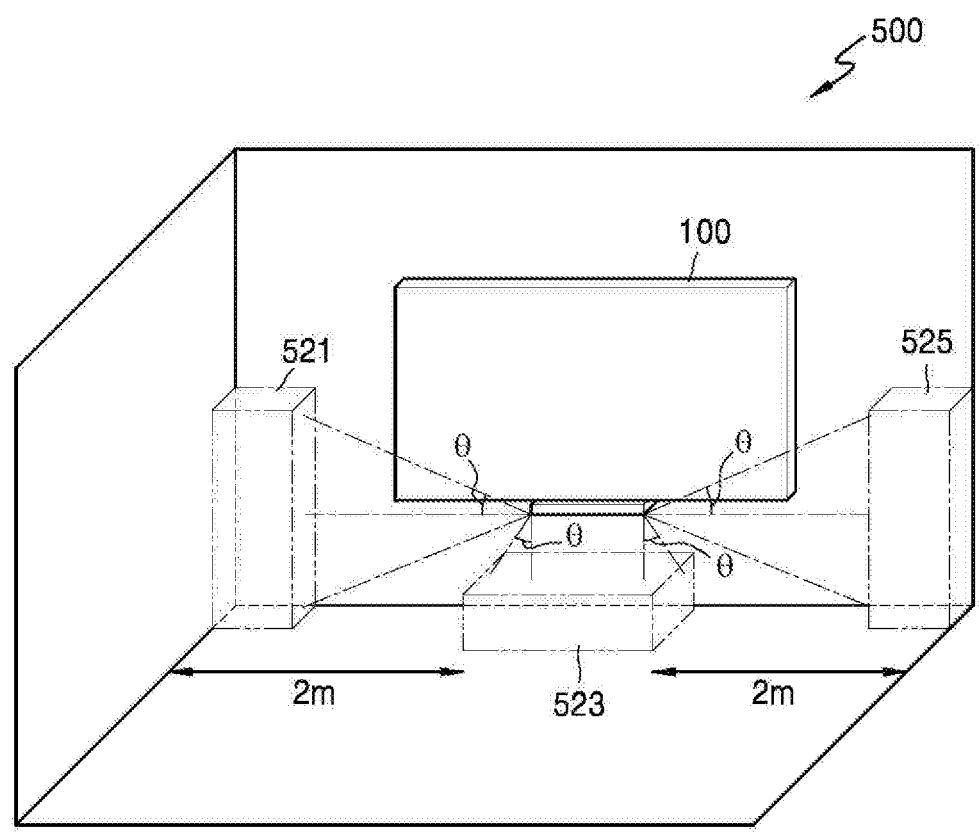
FIG. 5 illustrates an example in which a controller 120 identifies recommended locations.

FIG. 5 illustrates an example in which the controller 120 identifies recommended locations.

Referring to FIG. 5, the controller 120 may identify, as recommended locations 521, 523, and 525, spaces within angle θ from a wireless power receiver 510, from among areas within 2 m from the wireless power receiver 510 within a space 500 where the electronic device 100 is located. The controller 120 may determine one of the plurality of recommended locations 521, 523, and 525 to be the target location.

Figure 6:
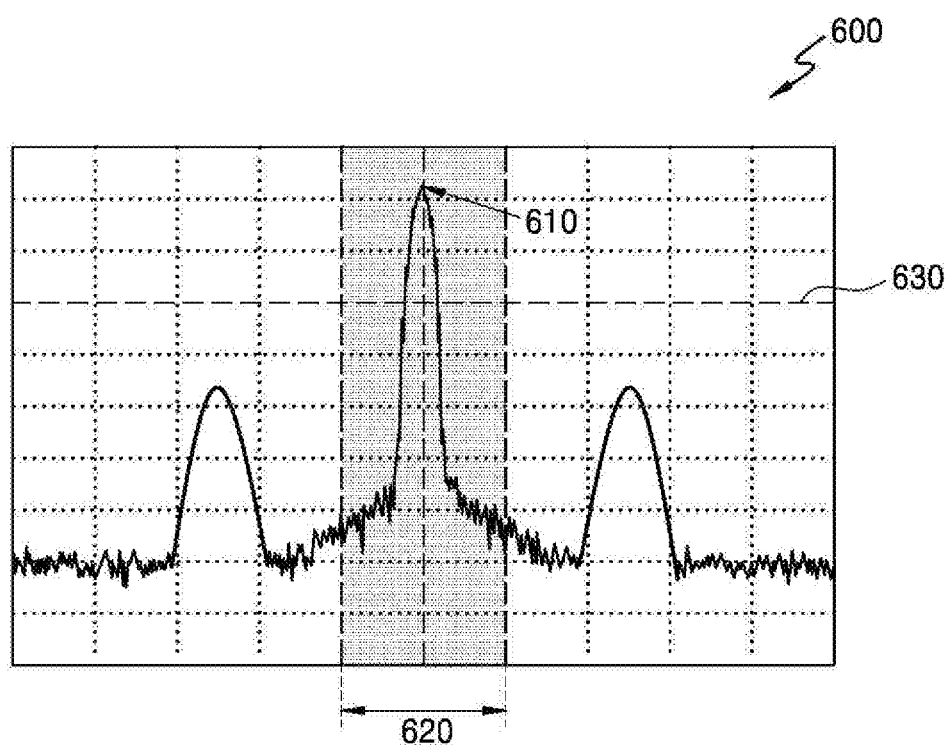
FIG. 6 illustrates an example in which the controller 120 determines whether a wireless power transmission device has been moved to a target location.

FIG. 6 illustrates an example in which the controller 120 determines whether the wireless power transmission device 200 has been moved to the target location.

Referring to FIG. 6, as the wireless power transmission device 200 is moved, the controller 120 may update a spectrum 600 of a frequency of a magnetic field. The controller 20 may determine whether a first point 610 representing the center of the wireless power transmission device 200 is located within a target range 620 of the spectrum 600, in order to consider the fact that the target location is within an angle θ from the wireless power receiver 110.

The controller 120 may determine whether the strength of a magnetic field of the first point 610 is greater than a threshold 630. When the strength of the magnetic field of the first point 610 is less than the threshold 630, the controller 120 may determine that the wireless power transmission device 200 is located in a wrong direction or another object obstructs wireless power transmission. The controller 120 may photograph the wireless power transmission device 200 by activating the image sensor, and may provide a user interface in order to provide a guide (for example, 'Remove an object put on the wireless power transmission device 200, please.') for increasing the reception ratio. A method in which the controller 120 determines a direction in which the wireless power transmission device 200 is put will be described later in detail with reference to FIG. 9.

A case where the sensing unit 130 and the wireless power receiver 110 exist at the same or similar locations within the electronic device 100 or a case where the wireless power receiver 110 performs a function of a magnetic field sensor has been assumed and described in FIG. 6. When the sensing unit 130 exits at a different location from a location of the wireless power receiver 110, the controller 120 may move the target range 620 for determining whether the wireless power transmission device 200 has been moved to the target location, based on the location of the wireless power receiver 110.

Figure 7:
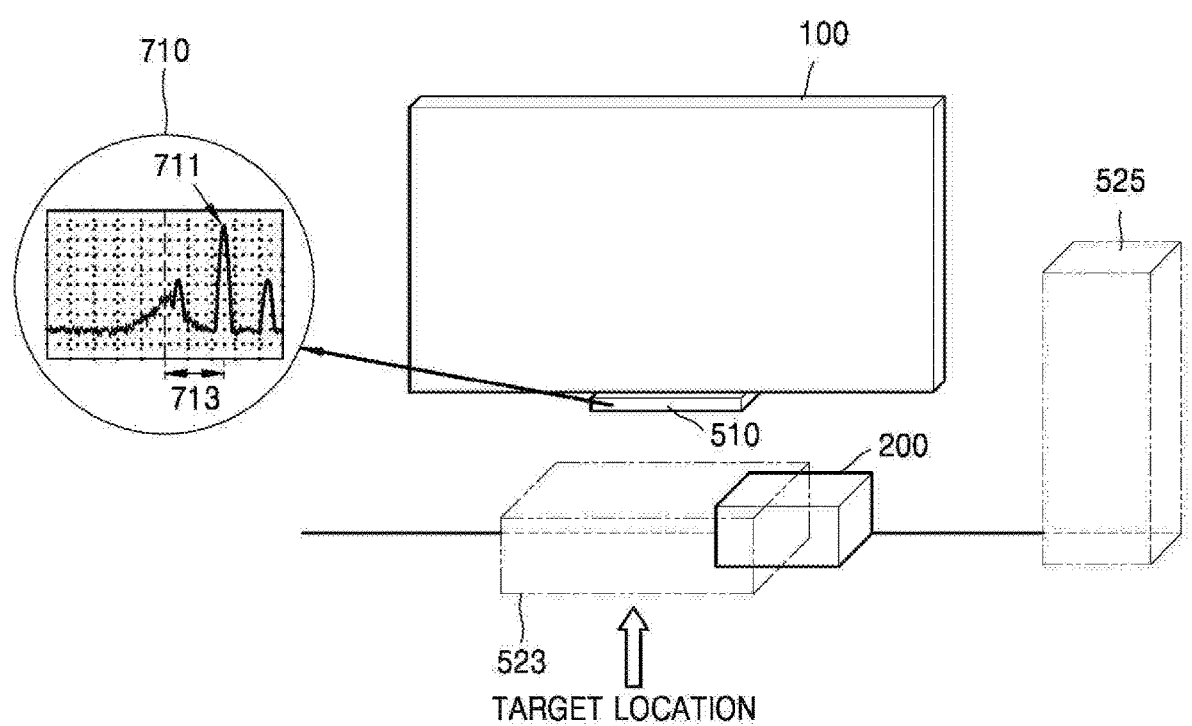
FIG. 7 illustrates an example in which the controller 120 determines a target location.

FIG. 7 illustrates an example in which the controller 120 determines a target location.

Referring to FIG. 7, the controller 120 may determine one of the plurality of recommended locations 521, 523, and 525 of FIG. 5 as the target location, based on a spectrum 710 of the frequency of the magnetic field sensed by the sensing unit 130.

For example, the controller 120 may identify that the current location of the wireless power transmission device 200 exists 50 cm to the right of the wireless power receiver 110, based on the spectrum 710 of the frequency of the magnetic field. In detail, the controller 120 may calculate the current location of the wireless power transmission device 200, based on a distance 713 by which a first point 711 where the magnetic field has a largest strength is away from a center of the spectrum 710.

The controller 120 may determine a recommended location close to the current location of the wireless power transmission device 200 (i.e., the recommended location 523), from among the plurality of recommended locations 521, 523, and 525, to be the target location.

Figure 8:
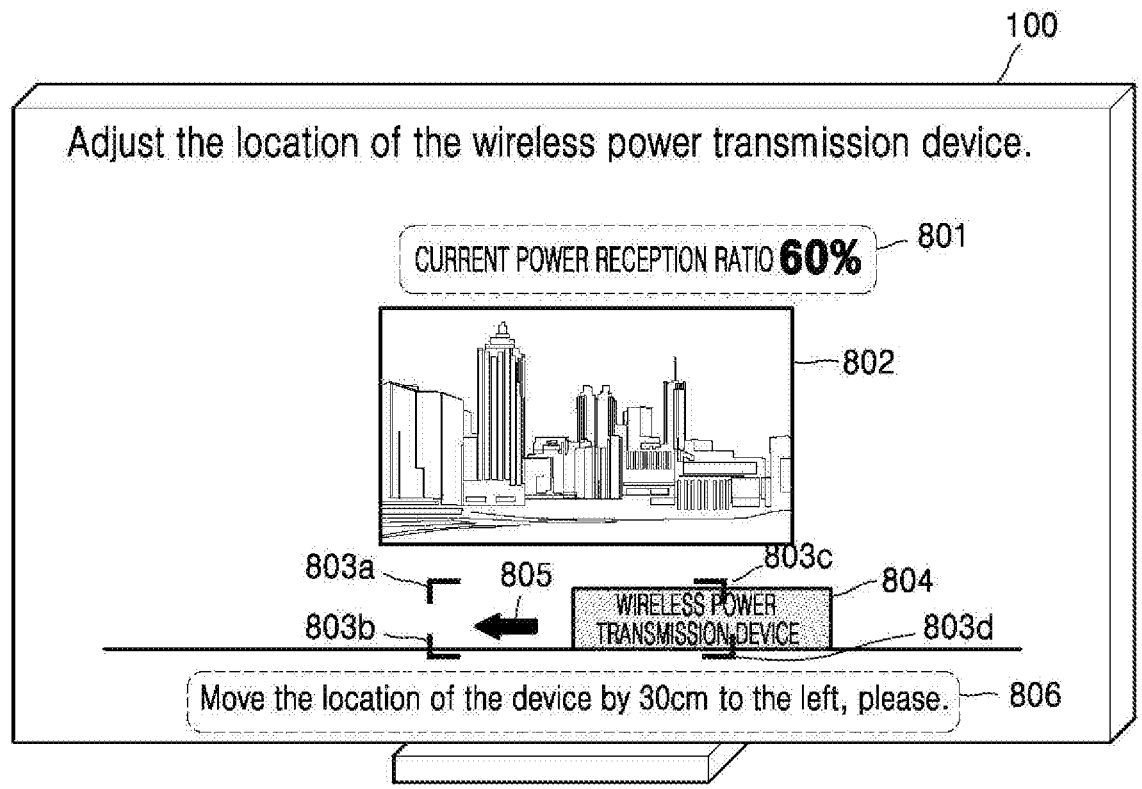
FIG. 8 illustrates an example in which the controller 120 provides a user interface.

FIG. 8 illustrates an example in which the controller 120 provides a user interface.

Referring to FIG. 8, the controller 120 may provide a user interface including an image 802 representing the electronic device 100, an image 804 representing the current location of the wireless power transmission device 200, images 803a through 803d representing the target location of the wireless power transmission device 200, and a guide image 805 indicating a movement direction for moving the current location of the wireless power transmission device 200 to the target location.

The controller 120 may provide a text image 806 representing a detailed instruction of "Move the location of the device by 30 cm to the left, please."

The controller 120 may provide a text image 801 representing a current power reception ratio by monitoring the amount of wireless power received by the wireless power receiver 110 relative to the amount of wireless power transmitted by the wireless power transmission device 200. The text image 801 representing the reception ratio may be updated at regular time intervals (for example, every one second).

Figure 9:
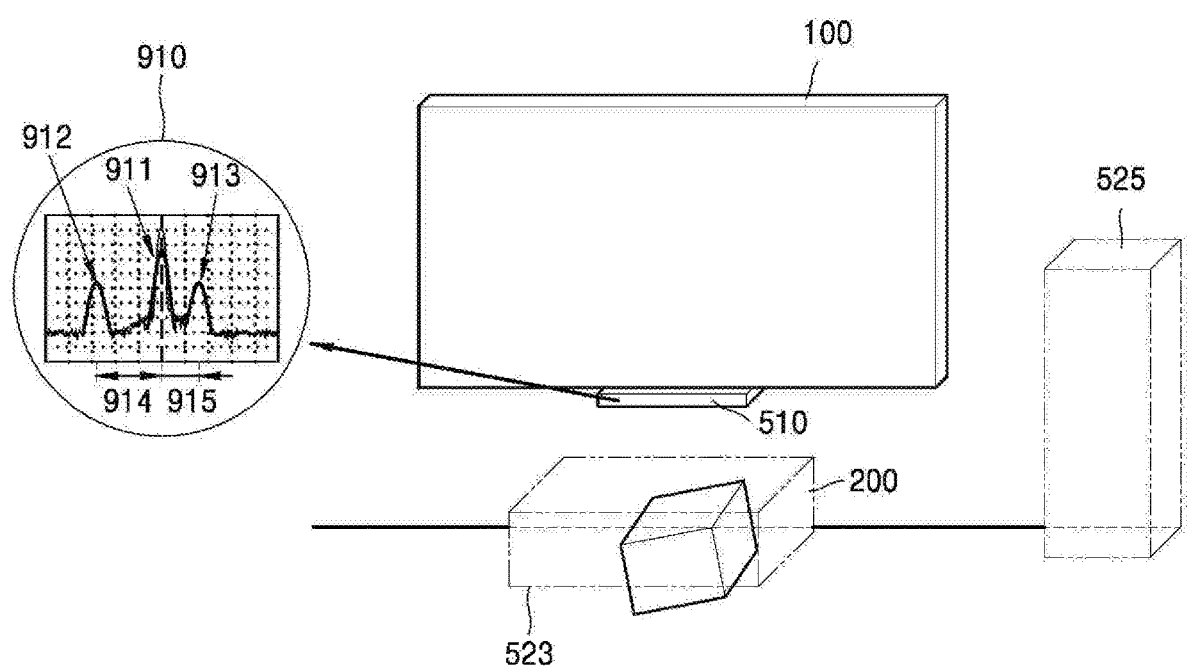
FIG. 9 illustrates another example in which the controller 120 determines a target location.

FIG. 9 illustrates another example in which the controller 120 determines a target location.

Referring to FIG. 9, when the reception ratio of the amount of wireless power received by the wireless power transmission device 200 is less than or equal to a threshold, the controller 120 obtains a spectrum 910 of a frequency of the magnetic field sensed by the sensing unit 130. The controller 120 may determine one of the plurality of recommended locations 521, 523, and 525 to be a target location to which the wireless power transmission device 200 is to move, based on the obtained spectrum 910.

For example, the controller 120 may determine, as the target location, a recommended location close to the current location of the wireless power transmission device 200, namely, the recommended location 523, by using the strength of the magnetic field in the spectrum 910 of a frequency of the magnetic field. However, because a first point 911 having a greatest frequency strength (i.e., a point indicating the center of the wireless power transmission device 200), in the obtained spectrum 910, is on a center of the spectrum 910 in FIG. 9, the controller 120 may perform a work for moving a direction in which the wireless power transmission device 200 is put.

The controller 120 may identity a first point 911, a second point 912, and a third point 913, the second point 912 and the third point 913 having the next highest frequency strengths after the first point 911 (i.e., points indicating both ends of the wireless power transmission device 200), and may determine whether the wireless power transmission device 200 is in a correct direction, based on a first interval 914 between the first point 911 and the second point 912 and a second interval 915 between the first point 911 and the third point 913. In detail, the controller 120 may calculate an angle at which the wireless power transmission device 200 is distorted, by using a difference between the first interval 914 and the second interval 915.

Alternatively, the controller 120 may determine a state in which the wireless power transmission device 200 is put, based on the image captured by the sensing unit 130.

Figure 10:
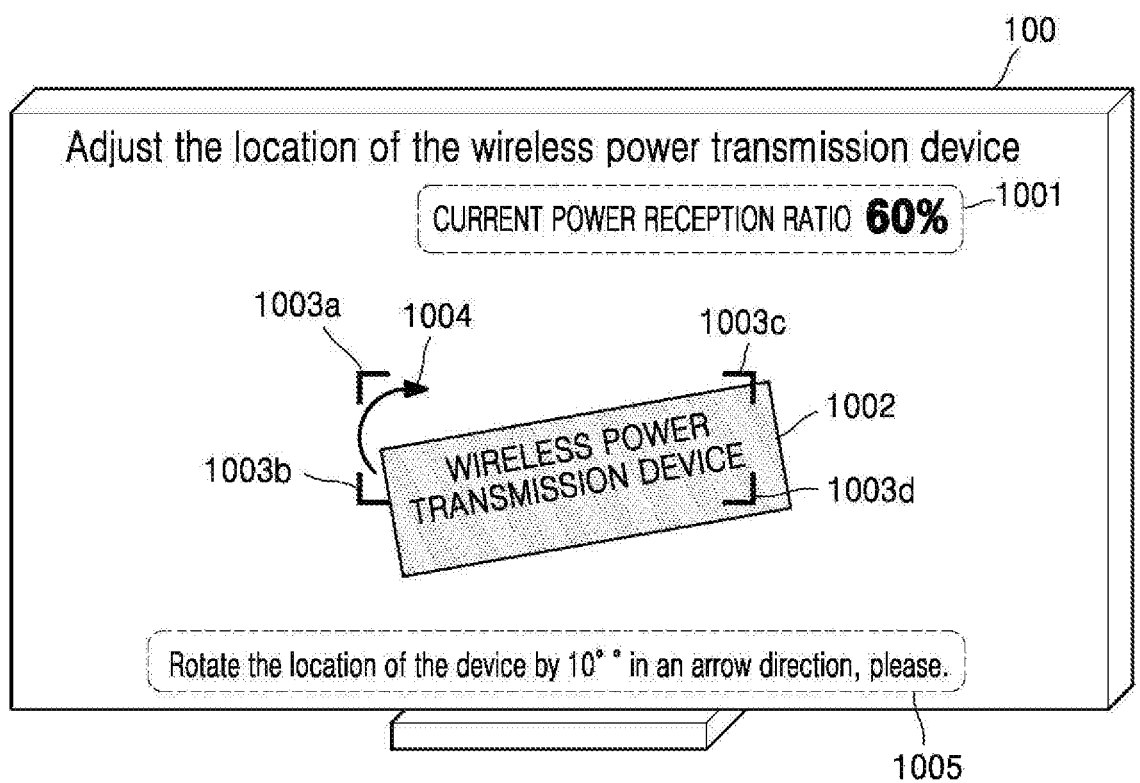
FIG. 10 illustrates another example in which the controller 120 provides a user interface.

FIG. 10 illustrates another example in which the controller 120 provides a user interface.

Referring to FIG. 10, the controller 120 may provide a user interface including an image 1002 representing the current location of the wireless power transmission device 200, images 1003a through 1003d representing the target location of the wireless power transmission device 200, and a guide image 1004 indicating a movement direction for moving the current location of the wireless power transmission device 200 to the target location.

The controller 120 may provide a text image 1005 representing a detailed instruction of "Rotate the location of the device by 10° in an arrow direction, please."

The controller 120 may also provide a text image 1001 representing a current power reception ratio by monitoring the amount of wireless power received by the wireless power receiver 110 relative to the amount of wireless power transmitted by the wireless power transmission device 200. The text image 1001 representing the reception ratio may be updated at regular time intervals (for example, every one second).

Figure 11:
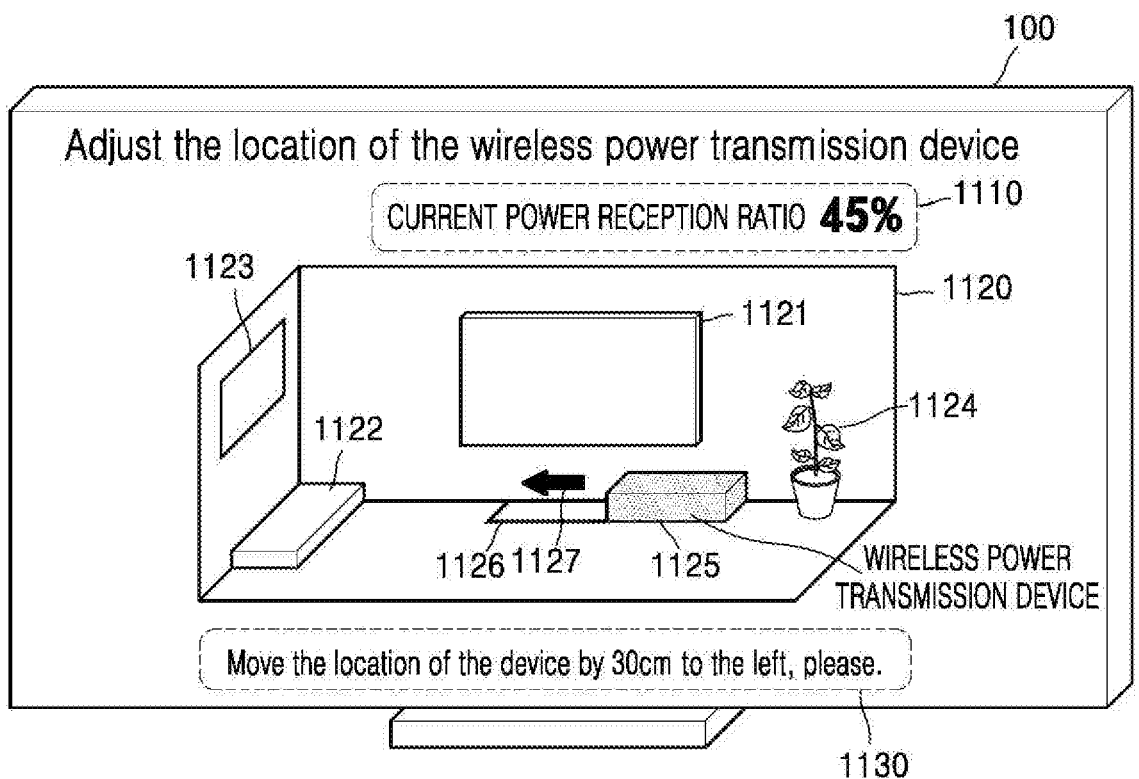
FIG. 11 illustrates another example in which the controller 120 provides a user interface.

FIG. 11 illustrates another example in which the controller 120 provides a user interface.

Referring to FIG. 11, the controller 120 may provide a 3D user interface, based on the image captured by the sensing unit 130.

For example, the controller 120 may identify objects existing in a 3D space where the electronic device 100 is located, based on the captured image. The sensing unit 130 may include a 3D image sensor or a plurality of image sensors. The controller 120 may obtain a 3D image from the sensing unit 130 or generate a 3D image from a plurality of images.

Accordingly, the controller 120 may provide a user interface including a 3D image 1120 representing a space in which the electronic device 100 is located. In detail, the controller 120 may provide a 3D user interface including images 1122, 1123, and 1124 representing identified objects, an image 1121 representing the electronic device 100, an image 1125 representing the current location of the wireless power transmission device 200, an image 1126 representing the target location of the wireless power transmission device 200, and a guide image 1127 indicating a movement direction for moving the current location of the wireless power transmission device 200 to the target location.

The controller 120 may provide a text image 1130 representing a detailed instruction of "Move the location of the device by 30 cm to the left, please."

The controller 120 may also provide a text image 1110 representing a current power reception ratio by monitoring the amount of wireless power received by the wireless power receiver 110 relative to the amount of wireless power transmitted by the wireless power transmission device 200.

Figure 12:
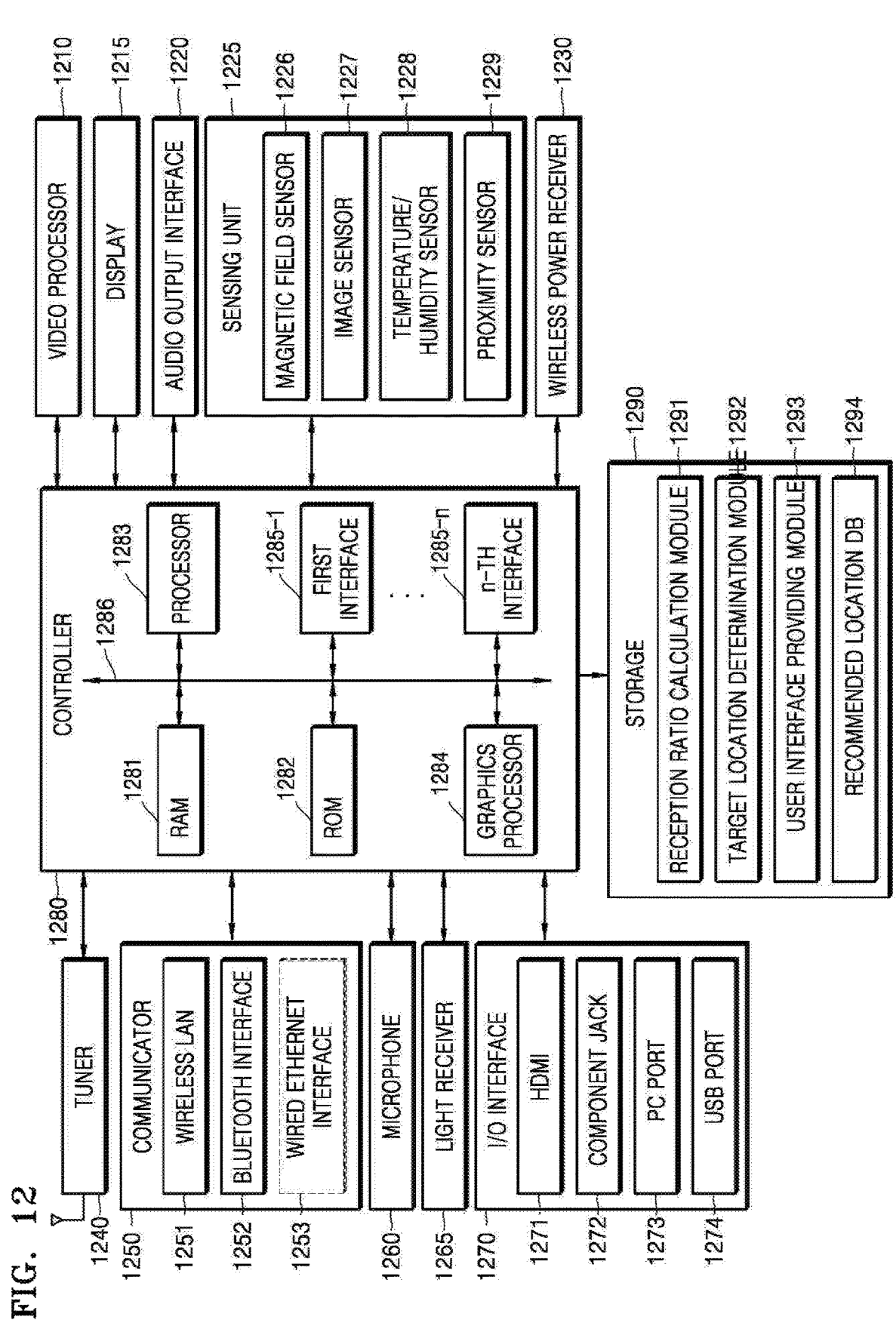
FIG. 12 is a block diagram of a detailed configuration of an electronic device.

FIG. 12 is a block diagram of a detailed configuration of the electronic device 100.

Referring to FIG. 12, the electronic device 100 includes a video processor 1210, a display 1215, an audio output interface 1220, a sensing unit 1225, a wireless power receiver 1230, a tuner 1240, a communicator 1250, a microphone 1260, a light receiver 1265, an input/output (I/O) interface 1270, a controller 1280, and a storage 1290.

The video processor 1210 processes video data that is received by the electronic device 100. The video processor 1210 may perform a variety of image processing, such as decoding, scaling, noise filtering, frame rate transformation, and resolution transformation, on the received video data.

The display 1215 may display video included in a broadcasting signal received via the tuner 1240 on the screen thereof, under the control of the controller 1280. The display 1215 may also display content (for example, a moving picture) that is input via the communicator 1250 or the I/O interface 1270. The display 1215 may output an image stored in the storage 1290 under the control of the controller 1280. The display 1215 may also display a voice user interface (UI) (e.g., including a voice command guide) for performing a voice recognition task corresponding to voice recognition, or a motion UI (e.g., including a user motion guide for motion recognition) for performing a motion recognition task corresponding to motion recognition.

According to embodiments, the display 1215 may display a user interface for guiding a location movement of the wireless power transmission device 200, under the control of the controller 1280.

The audio output interface 1220 may process audio data and output a result of the processing. The audio output interface 1220 may perform a variety of processing, such as decoding, amplification, or noise filtering, on the audio data. The audio output interface 1220 may include a plurality of audio processing modules to process audio data corresponding to a plurality of pieces of content.

The audio output interface 1220 outputs audio data included in a broadcasting signal received via the tuner 1240, under the control of the controller 1280. The audio output interface 1220 may also output audio data (for example, a voice or a sound) that is input via the communicator 1250 or the I/O interface 1270. The audio output interface 1220 may also output audio data stored in the storage 1290 under the control of the controller 1280. The audio output interface 1220 may include at least one of a speaker (not shown), a headphone output port (not shown), and a Sony/Philips Digital Interface (S/PDIF) output port (not shown).

According to embodiments, the audio output interface 1220 may output a user interface for guiding a location movement of the wireless power transmission device 200, under the control of the controller 1280. For example, the audio output interface 1220 may output a sound of "Move the location of the wireless power transmission device by 30 cm to the left, please.", under the control of the controller 1280.

The sensing unit 1225 may include at least one of a magnetic field sensor 1226, an image sensor 1227, a temperature/humidity sensor 1228, and a proximity sensor 1229, but embodiments are not limited thereto.

The magnetic field sensor 1226 may measure a magnetic field in a lengthwise direction of the sensor or a direction perpendicular to a length of the sensor. According to embodiments, the magnetic field sensor 1226 may obtain a frequency spectrum of the magnetic field including the predetermined frequency of the wireless power transmission device 200.

The electronic device 100 may include at least one magnetic field sensor 1226. Each magnetic field sensor 1226 may be separated from each other within the electronic device 100.

The image sensor 1227 may receive an image by performing image processing with respect to a recognition range of recognition conducted via a lens (not shown). For example, the recognition range of the image sensor 1227 may be a distance within 0.1 to 5 m from the image sensor 1227. The image sensor 1227 may variously support the recognition range by supporting optical zoom or digital zoom. The image sensor 1227 may provide a result of the image processing to the controller 1280.

The image sensor 1227 may receive an image corresponding to a motion of a user within the recognition range. The motion of the user may include a part of the body of the user or a motion or the like of a part of the user, such as the face, a facial expression, the hand, the fist, and a finder of the user.

When the image sensor 1227 includes a plurality of cameras, a 3D still image or a 3D motion may be received by the plurality of cameras.

The image sensor 1227 may be integrated with or separate from the electronic device 100. A separate device (not shown) including the separate image sensor 1227 may be electrically connected to the electronic device 100 via the communicator 1250 or the I/O interface 1270.

The temperature/humidity sensor 1228 may measure a temperature around the temperature/humidity sensor 1228 by using a change in the resistance of electricity according to temperature. The temperature/humidity sensor 1228 may sense the current location of the wireless power transmission device 200 by sensing heat emitted by the wireless power transmission device 200.

The proximity sensor 1229 may sense apparatuses closed to the proximity sensor 1229, and may provide information about the apparatuses to the controller 1280. The controller 1280 may request the detected apparatuses for their ID values via the communicator 1250. The controller 1280 may identify the current location of the wireless power transmission device 200, based on the received ID values.

It will be understood by one of one of ordinary skill in the art that a sensor included in the sensing unit 1225 may be added or deleted, in accordance with the performance of the electronic device 100.

The wireless power receiver 1230 may supply power received from the wireless power transmission device 200, to the internal components 1210 through 1290 of the electronic device 100, under the control of the controller 1280. Further, the wireless power receiver 1230 may supply, to the internal components 1210 through 1290, power that is output from one or more batteries (not shown) disposed within the electronic device 100, under the control of the controller 1280.

According to embodiments, the wireless power receiver 1230 may receive electromagnetic wave energy from the wireless power transmission device 200 by adjusting the frequency transmitted by the wireless power transmission device 200 and the resonance frequency of the wireless power receiver 110. The wireless power receiver 1230 corresponds to the wireless power receiver 110 of FIG. 2, and thus a detailed description thereof will be omitted.

The tuner 1240 may perform signal processing with respect to a wired or wireless broadcasting signal via amplification, mixing, resonance, or the like, and may tune and select only a frequency of a channel which the electronic device 100 wants to receive from among many radio wave components of the received broadcasting signal. The broadcasting signal may include audio, video, and additional information (for example, an electronic program guide (EPG)).

The tuner 1240 may receive a broadcasting signal in a frequency band corresponding to a channel number (e.g., cable broadcasting No. 506) according to a user input (for example, a control signal received from a control device, e.g., a channel number input, a channel up-down input, and a channel input on an EPG screen image).

The tuner 1240 may receive a broadcasting signal from various sources, such as terrestrial broadcasting, cable broadcasting, satellite broadcasting, and Internet broadcasting. The tuner 1240 may also receive a broadcasting signal from a source such as analog broadcasting or digital broadcasting. The broadcasting signal received via the tuner 1240 is decoded (for example, audio decoding, video decoding, or additional information decoding) and is thus divided into audio, video, and/or additional information. The audio, the video, and/or the additional information may be stored in the storage 1290 under the control of the controller 1280.

The electronic device 100 may include a single tuner 1240 or a plurality of tuners 1240. The tuner 1240 may be all-in-one with the electronic device 100, or implemented as a separate device (for example, a tuner (not shown) that is connected to an STB (not shown) and the I/O interface 1270) having a tuner that is electrically connected to the electronic device 100.

The communicator 1250 may connect the electronic device 100 to an external apparatus (for example, an audio apparatus) under the control of the controller 1280. The controller 1280 may transmit/receive content to/from the external apparatus connected via the communicator 1250, download an application from the external apparatus, or perform web-browsing. The communicator 1250 may include a wireless local area network (LAN) 1251, a Bluetooth network 1252, or a wired Ethernet network 1253 in correspondence to a performance and a structure of the electronic device 100. The communicator 1250 may include a combination of the wireless LAN 1251, the Bluetooth network 1252, and the wired Ethernet network 1253. The communicator 1250 may receive a control signal of a control apparatus under the control of the controller 1280. The control signal may be implemented as a Bluetooth signal, an RF signal, or a Wi-Fi signal.

According to embodiments, the communicator 1250 may receive from the wireless power transmission device 200 information about wireless power transmitted by the wireless power transmission device 200. For example, the communicator 1250 may receive information about the amount of wireless power transmitted by the wireless power transmission device 200. The communicator 1250 may also receive information about the frequency of the wireless power transmission device 200.

The communicator 1250 may transmit, to the wireless power transmission device 200, a request to increase or decrease the amount of wireless power transmitted by the wireless power transmission device 200, based on the amount of power consumption of the electronic device 100.

The communicator 1250 may further include short-range communication (for example, NFC or Bluetooth low energy (BLE)), in addition to the Bluetooth network 1252.

The microphone 1260 receives an uttered voice of the user. The microphone 1260 may transform the received voice into an electrical signal and output the electrical signal to the controller 1280. The user voice may include, for example, a voice corresponding to a menu or function of the electronic device 100. A recognition range of the microphone 1260 may be recommended to be within 4 m from the microphone 1260 to a location of the user, and may vary in correspondence to the magnitude of the voice of the user and a surrounding environment (for example, a speaker sound or ambient noise).

The microphone 1260 may be integrated with or separate from the electronic device 100. The separated microphone 1260 may be electrically connected to the electronic device 100 via the communicator 1250 or the I/O interface 1270.

It will be easily understood by one of ordinary skill in the art to which the present disclosure pertains that the microphone 1260 may be excluded according to the performance and structure of the electronic device 100.

The light receiver 1265 receives an optical signal (including a control signal) from an external control apparatus via a light window or the like of the bezel of the display 1215. The light receiver 1265 may receive an optical signal corresponding to a user input (for example, touch, pressing, a touch gesture, a voice, or a motion) from the control apparatus. A control signal may be extracted from the received optical signal under the control of the controller 1280.

The I/O interface 1270 receives video (for example, a moving picture), audio (for example, a voice or music), and additional information (for example, an EPG) from outside the electronic device 100 under the control of the controller 1280. The I/O interface 1270 may include a High-Definition Multimedia Interface (HDMI) port 1271, a component jack 1272, a PC port 1273, or a USB port 1274. The I/O interface 1270 may include a combination of the HDMI port 1271, the component jack 1272, the PC port 1273, and the USB port 1274.

It will be understood by one of ordinary skill in the art that the structure and operation of the I/O interface 1270 may be variously implemented according to embodiments.

The controller 1280 controls an overall operation of the electronic device 100 and signal transfer among the internal components 1210 through 1290 of the electronic device 100 and processes data. When there is an input of a user or stored preset conditions are satisfied, the controller 1280 may execute an operation system (OS) and various applications that are stored in the storage 1290.

The controller 1280 may include random-access memory (RAM) 1281 that stores a signal or data input by an external source of the electronic device 100 or is used as a memory area for various operations performed by the electronic device 100, read-only memory (ROM) 1282 that stores a control program for controlling the electronic device 100, and a processor 1283. However, embodiments are not limited thereto, and the controller 1280 may include the ROM 1282 and the processor 1283, except for the RAM 1281.

The processor 1283 may include a graphics processing unit (GPU) (not shown) for performing video graphics processing. The processor 1283 may be implemented as a system-on-chip (SoC) including a core (not shown) and a GPU (not shown). The processor 1283 may include a plurality of processors.

A graphics processor 1284 generates a screen image including various objects, such as an icon, an image, and a text, by using an arithmetic unit (not shown) and a rendering unit (not shown).

First through n-th interfaces 1285-1 through 1285-*n* are connected to the above-described components of the electronic device 100. One of the first through n-th interfaces 1285-1 through 1285-*n* may be a network interface that is connected to an external apparatus via a network.

The RAM 1281, the ROM 1282, the processor 1283, the graphics processor 1284, and the first through n-th interfaces 1285-1 through 1285-*n* may be connected to each other via an internal bus 1286.

According to embodiments, the controller 1280 may monitor the amount of wireless power received by the wireless power receiver 110.

The controller 1280 may calculate a reception ratio of the amount of wireless power received by the wireless power receiver 110 relative to the amount of wireless power transmitted by the wireless power transmission device 200.

When the reception ratio is lower than the threshold, the controller 1280 may activate the sensing unit 1225 to sense the current location of the wireless power transmission device 200.

The controller 1280 may provide a user interface that guides a location movement from the current location of the wireless power transmission device 200 to a target location for increasing the reception ratio. The target location may be a location where the wireless power reception ratio from the wireless power transmission device 200 is equal to or greater than the threshold (for example, 80%), and may be determined by the spectrum of the frequency of the magnetic field sensed by the sensing unit 130. The target location may be determined considering physical objects existing in a space where the electronic device 100 is located.

The controller 1280 may provide a user interface including at least one image for guiding a change in the location of the wireless power transmission device 200. For example, the controller 1280 may provide a user interface including at least one of an image representing the current location of the wireless power transmission device 200, an image representing the target location of the wireless power transmission device 200, and a guide image indicating a movement direction for moving the current location of the wireless power transmission device 200 to the target location.

The controller 1280 may provide a user interface including a text representing a wireless power reception ratio.

The controller 1280 corresponds to the controller 120 of FIG. 2, and thus a detailed description thereof will be omitted. It will be easily understood by one of ordinary skill in the art to which the present disclosure pertains that the structure and operation of the controller 1280 may be variously implemented according embodiments of the present disclosure.

The storage 1290 may store various data, programs, or applications for driving and controlling the electronic device 100 under the control of the controller 1280. The storage 1290 may store input/output signals or data corresponding to driving of the video processor 1210, the display 1215, the audio output interface 1220, the sensing unit 1225, the wireless power receiver 1230, the tuner 1240, the communicator 1250, the microphone 1260, the light receiver 1265, and the I/O interface 1270. The storage 1290 may store a control program for controlling the electronic device 100 and the controller 1290, an application initially provided by a manufacturer or downloaded from outside the electronic device 100, a graphical user interface (GUI) associated with the application, objects (for example, an image text, an icon, and a button) for providing the GUI, user information, a document, databases, or related pieces of data.

According to embodiments, the term "storage" may include the storage 1290, the ROM 1282 or the RAM 1281 of the controller 100, or a memory card (not shown) (e.g., a micro SD card or a USB memory) mounted in the electronic device 100. The storage 1290 may include a non-volatile memory, a volatile memory, a hard disk drive (HDD), or a solid state drive (SSD).

The storage 1290 may include a broadcasting receiving module, a channel control module, a volume control module, a communication control module, a voice recognition module, a motion recognition module, a light receiving module, a display control module, an audio control module, an external input control module, a power control module, a power control module of a wirelessly (for example, Bluetooth) connected external apparatus, a voice database (DB), or a motion DB, which are not shown. The controller 1280 may perform these functions by using the software stored in the storage 1290.

Each module include instructions for performing various functions provided by the electronic device 100, and the functions of the modules may be intuitively inferred from the names of the modules by one of ordinary skill in the art.

According to embodiments, the storage 1290 may include a reception ratio calculation module 1291 including at least one instruction of calculating a reception ratio indicating a ratio of the power received by the electronic device 100 relative to the power transmitted by the wireless power transmission device 200.

According to embodiments, the storage 1290 may store a recommended location DB 1294.

The storage 1290 may also include a target location determination module 1292 that determines the target location from among the recommended locations. The target location determination module 1292 may include at least one instruction of determining a recommended location at a short distance from the current location of the wireless power transmission device 200, from among the recommended locations, as the target location, based on the frequency spectrum of the magnetic field obtained by the sensing unit 1225.

The storage 1290 may further include a user interface providing module 1293 including at least one instruction of providing a user interface that guides a location movement from the current location of the wireless power transmission device 200 to a target location for increasing the reception ratio.

According to the performance of the electronic device 100, at least one component may be added to the components (for example, the components 1210 through 1290) of the electronic device 100 of FIG. 12, or at least one of the components (for example, the components 1210 through 1290) of the electronic device 100 of FIG. 12 may be deleted. It will also be easily understood by one of ordinary skill in the art to which the present disclosure pertains that the locations of the components (for example, the components 1210 through 1290) of the electronic device 100 may be changed according to the performance or structure of the electronic device 100.

Figure 13:
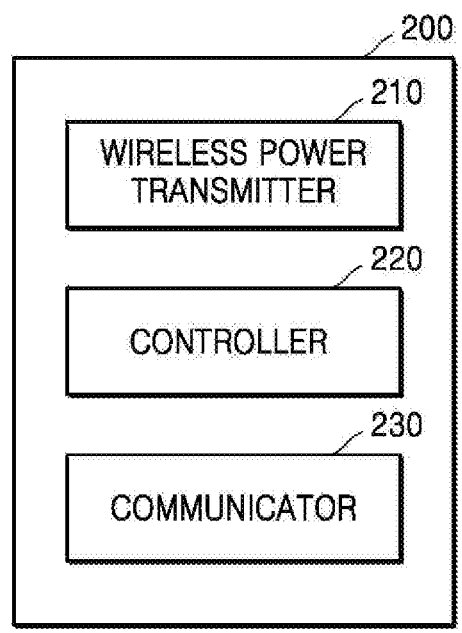
FIG. 13 is a block diagram of a configuration of a wireless power transmission device according to an embodiment.

FIG. 13 is a block diagram of a structure of the wireless power transmission device 200 according to an embodiment.

Referring to FIG. 13, the wireless power transmission device 200 may include a wireless power transmitter 210, a controller 220, and a communicator 230.

The wireless power transmitter 210 may convert power received from the power source 300 of FIG. 1 into an electromagnetic wave having a predetermined frequency (or at least one frequency). For example, the wireless power transmitter 210 may generate a magnetic field that vibrates with the predetermined frequency. The predetermined frequency may be several hundreds of Hz through several tens of MHz.

The wireless power transmitter 210 may include a magnet (not shown) and at least one resonance coil (not shown). The resonance coil may have a spiral structure or a helical structure, but embodiments of the present disclosure are not limited thereto. The resonance coil may be formed of a predetermined material including proton, and the magnet may generate a magnetic field that vibrates with a predetermined frequency, by rotating the proton included in the resonance coil.

The controller 220 may control overall operations of the wireless power transmission device 200. For example, the controller 220 may control the wireless power transmitter 210 and the communicator 230.

The controller 220 may monitor the amount of power received from the power source 300. In addition, the controller 220 may control the communicator 230 to provide information about the amount of power received from the power source 300 to the electronic device 100.

The controller 220 may monitor the amount of wireless power generated by the wireless power transmitter 210 and/or the amount of wireless power transmitted by the wireless power transmission device 200. The controller 220 may control the communicator 230 to provide information about the amount of wireless power transmitted by the wireless power transmission device 200 to the electronic device 100.

The controller 220 may receive a request to increase or decrease transmission of the amount of wireless power from the electronic device 100 via the communicator 230. In this case, the controller 220 may control the wireless power transmitter 210 to increase or decrease the amount of wireless power that is transmitted to the electronic device 100.

The communicator 230 may include one or more components that enable the wireless power transmission device 200 to transmit or receive data to or from the electronic device 100 and the like. For example, the communicator 230 may include a wireless LAN (not shown), a short-range wireless communication interface (not shown), and the like. The wireless LAN may support the IEEE802.11x wireless LAN standard of the Institute of Electrical and Electronics Engineers (IEEE). Accordingly, the wireless LAN may transmit or receive data according to the wireless LAN standard under the control of the controller 220. The short-range communication interface may include, but are not limited to Bluetooth, BLE, infrared data association (IrDA), ultra wideband (UWB), and NFC.

The communicator 230 may transmit, to the electronic device 100, information about at least one of the amount of power received from the power source 300 under the control of the controller 220, the amount of wireless power generated by the wireless power transmitter 210, and the amount of wireless power transmitted to the electronic device 100.

The communicator 230 may receive a request to increase or decrease the amount of wireless power from the electronic device 100.

The wireless power transmission device 200 may be implemented in a combined form with another device. For example, the wireless power transmission device 200 may be implemented in a combined form with a sound bar, an STB, an IP STP, a digital broadcasting receiver, or the like.

Figure 14:
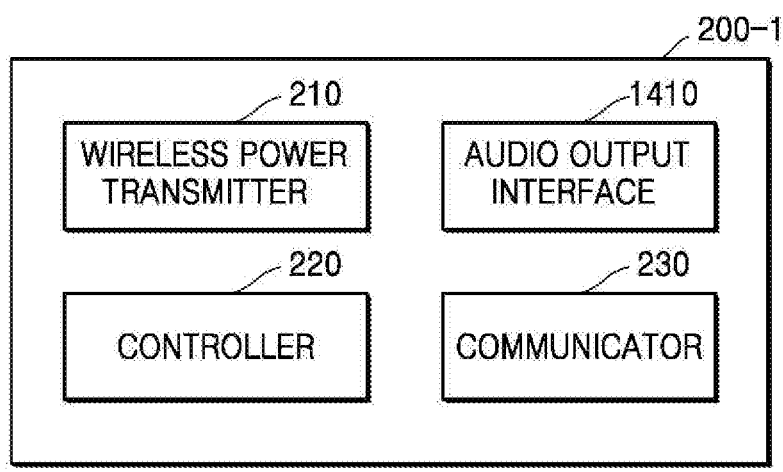
FIG. 14 is a block diagram of a configuration of a wireless power transmission device according to another embodiment.

FIG. 14 is a block diagram of a structure of a wireless power transmission device 200-1 according to another embodiment.

Referring to FIG. 14, the wireless power transmission device 200-1 may be implemented in a combined form with a sound bar. The wireless power transmission device 200-1 may further include an audio output interface 1410 in addition to the wireless power transmitter 210, the controller 220, and the communicator 230.

The communicator 230 may receive audio data from the electronic device 100.

The audio output interface 1410 may be implemented using a 1-channel, 2-channel, or 2.1-channel speaker. The audio output interface 1410 may also be implemented using a 4-channel speaker, a 4.1-channel speaker, a 5.1-channel speaker, a 6.1-channel speaker, a 7.1-channel speaker, a 9.1-channel speaker, or a 11.2-channel speaker, but it will be understood by one of ordinary skill in the art that embodiments are not limited thereto.

The controller 220 may up-mix the received audio data (e.g., audio data from a 2.0-channel speaker) and may output the up-mixed audio data to speakers (e.g., additional speakers (not shown)) of any of a 2.1-channel system, a 4-channel system, a 5-channel system, a 5.1-channel system, or a 7.1-channel system.

The controller 220 may down-mix audio data (e.g., audio data from a 7.1-channel system) and may output the down-mixed audio data to speakers of any of a 2-channel system, a 2.1-channel system, or a 5.1-channel system. The controller 220 may output received audio data in consideration of the number of speakers of the audio output interface 1410 and the number of additional speakers (not shown). For example, when the number of speakers that corresponds to received audio data is equal to the number of speakers of a 5.1-channel system, the controller 220 may output the received audio data to the speakers (having, for example, a 5.1-channel system) of the audio output interface 1410. Alternatively, when the number of speakers that corresponds to a received audio is equal to the number of speakers of a 5.1-channel system, the controller 220 may add additional speakers (having, for example, a 3-channel system) to the speakers (having, for example, a 2.1-channel system) of the audio output interface 1410 and may output the received audio to the speakers collectively having a 5.1-channel system.

The controller 220 may provide any of various audio output effects (e.g., a movie, sports, a rock concert, and an orchestra), based on the number of the speakers of the audio output interface 1410.

Figure 15:
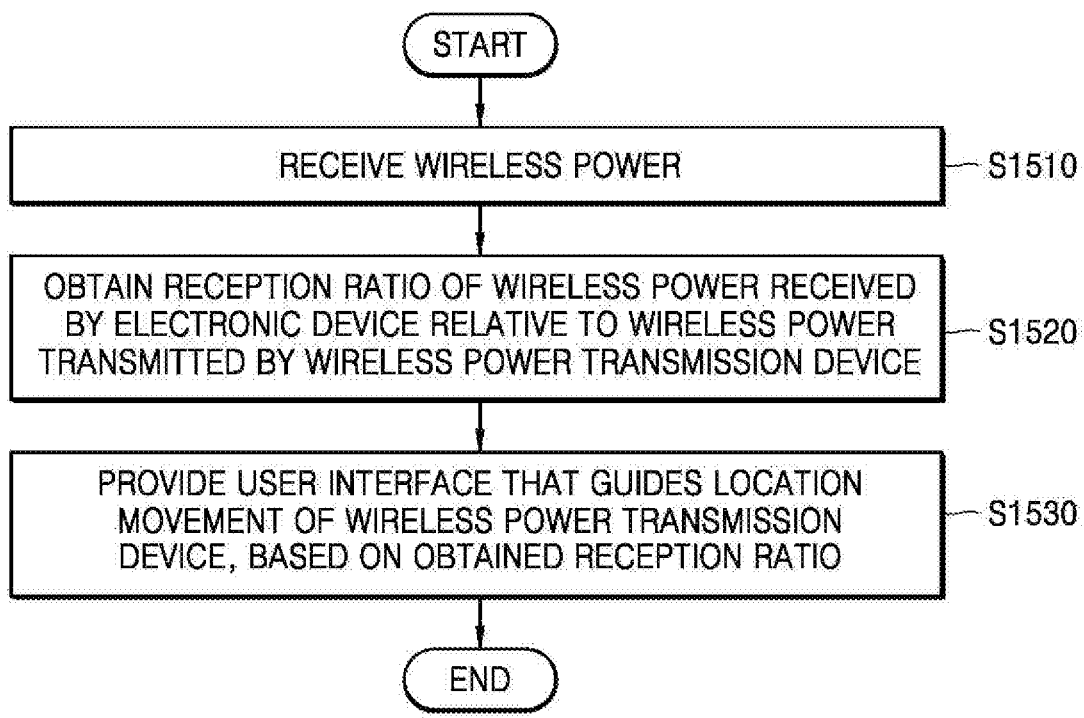
FIG. 15 is a flowchart of a method by which an electronic device provides a user interface, according to an embodiment.
Figure 16:
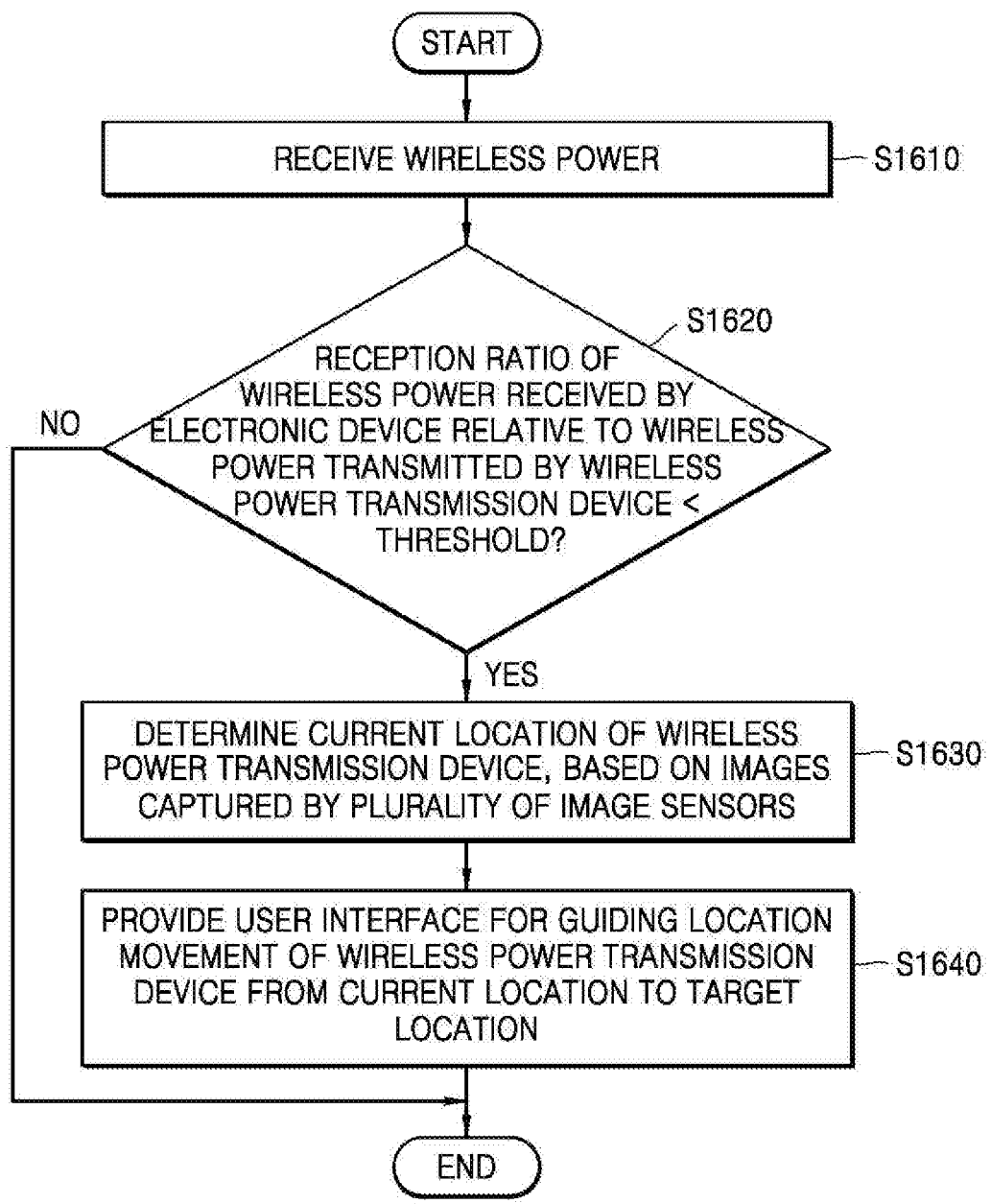
FIG. 16 is a flowchart of a method by which an electronic device provides a user interface by using an image sensor, according to an embodiment.
Figure 17:
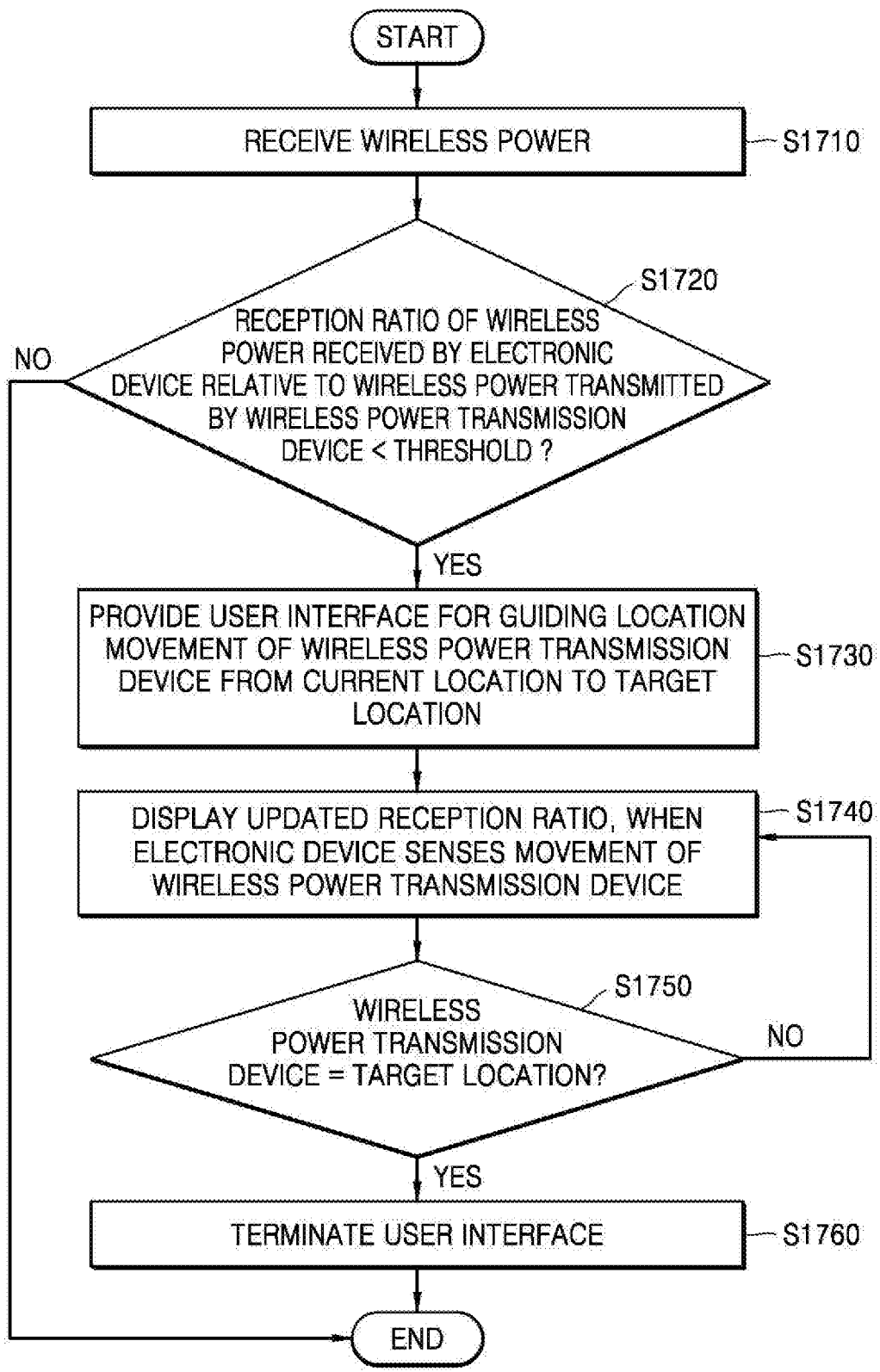
FIG. 17 is a flowchart of a method by which an electronic device provides a user interface, according to another embodiment.

FIGS. 15 through 17 are flowcharts of methods in which an electronic device in a wireless power transmission/reception system provides a user interface, according to an embodiment. The methods of FIGS. 15-17 in which the electronic device provides a user interface are related with the embodiments described above with reference to FIGS. 1 through 14. Accordingly, although omitted, previous descriptions with reference to FIGS. 1-14 also apply to the user interface providing methods of FIGS. 15-17.

FIG. 15 is a flowchart of a method in which the electronic device 100 provides a user interface, according to an embodiment.

Referring to FIG. 15, in operation S1510, the electronic device 100 may receive wireless power from the wireless power transmission device 200. For example, the electronic device 100 may receive electromagnetic wave energy from the wireless power transmission device 200 by adjusting the frequency transmitted by the wireless power transmission device 200 and a resonance frequency or a lamor frequency of the electronic device 100.

Alternatively, the electronic device 100 may receive wireless power according to an electromagnetic induction method, an electromagnetic wave method, or the like.

In operation S1520, the electronic device 100 may obtain a reception ratio of the wireless power received by the electronic device 100 relative to the wireless power transmitted by the wireless power transmission device 200.

The electronic device 100 may monitor the wireless power received from the wireless power transmission device 200. The electronic device 100 may receive information about the wireless power transmitted by the wireless power transmission device 200. The information about the wireless power may be information about the amount of wireless power. Alternatively, the amount of wireless power transmitted by the wireless power transmission device 200 may be a fixed value and may be previously stored in the electronic device 100. In this case, the electronic device 100 may obtain a reception ratio of the wireless power received by the electronic device 100 relative to the pre-stored amount of wireless power.

In operation S1530, the electronic device 100 may provide a user interface that guides a location movement of the wireless power transmission device 200, based on the reception ratio. For example, the electronic device 100 may provide a user interface including at least one image for guiding a location movement of the wireless power transmission device 200.

For example, the electronic device 100 may provide, to the entirety or a portion of a screen of the electronic device 100, a visual user interface instructing movement of the wireless power transmission device 200. Alternatively, the electronic device 100 may provide an auditory user interface via a speaker included inside or outside the electronic device 100, or may provide visual and auditory user interfaces.

The electronic device 100 may generate a user interface including at least one image for guiding a location change of the wireless power transmission device 200. In detail, the controller 120 may generate a user interface including at least one image that represents a recommended location for increasing the reception ratio. The recommended location may include information about at least one experimentally predetermined location. For example, the recommended location may include information about a critical distance (for example, within 2 m) and a critical angle (for example, within 30°) from the wireless power receiver 110. When the electronic device 100 receives wireless power at a reception ratio equal to or greater than a threshold, the recommended locations may include information indicating a location of the wireless power transmission device 200.

The electronic device 100 may sense a current location of the wireless power transmission device 200 and may provide a user interface that guides a location movement from the current location of the wireless power transmission device 200 to the target location.

When the calculated reception ratio is less than a threshold (e.g., 80%), the electronic device 100 may sense the current location of the wireless power transmission device 200. For example, the electronic device 100 may sense the current location of the wireless power transmission device 200 by using at least one of a magnetic field sensor (or a hall sensor), an image sensor, a temperature/humidity sensor, an infrared sensor, and a proximity sensor.

The electronic device 100 may sense a strength of a magnetic field around the electronic device 100, by using a magnetic field sensor. In detail, the electronic device 100 may obtain a frequency spectrum of a magnetic field including a predetermined frequency that is transmitted by the wireless power transmission device 200 to provide wireless power. The electronic device 100 may sense the current location of the wireless power transmission device 200 and a size of the wireless power transmission device 200 by using a change in the strength of the magnetic field that appears on the frequency spectrum. The embodiment of FIG. 4 is applicable to a method in which the electronic device 100 senses a size and the current location of the wireless power transmission device 200.

Alternatively, the electronic device 100 may identify the predetermined frequency of the wireless power transmission device 200 from the frequency spectrum. In this case, information about the predetermined frequency transmitted by the wireless power transmission device 200 may be pre-registered in the electronic device 100.

Alternatively, the electronic device 100 may sense the current location of the wireless power transmission device 200, based on an image captured by an image sensor (for example, a CMOS sensor).

Alternatively, the electronic device 100 may sense the current location of the wireless power transmission device 200 by sensing the heat emitted by the wireless power transmission device 200 by using a temperature/humidity sensor.

Alternatively, the electronic device 100 may sense devices located within a certain range from the electronic device 100, by using a proximity sensor. In this case, the electronic device 100 may request the sensed devices for their ID values and receive the ID values from the sensed devices. When the received ID values include an ID value of the wireless power transmission device 200, the electronic device 100 may calculate the current location of the wireless power transmission device 200.

The electronic device 100 may include a plurality of sensors. For example, the sensing unit 130 may include a magnetic field sensor and an image sensor. When the frequency received from the wireless power transmission device 200 has a weak strength, the electronic device 100 may activate the image sensor.

The target location may be a location that enables the wireless power reception ratio from the wireless power transmission device 200 to be equal to or greater than the threshold (for example, 80%). Further, the target location may be determined by the spectrum of the frequency of the magnetic field sensed by the electronic device 100. For example, the electronic device 100 may select a recommended location at a short distance from the current location of the wireless power transmission device 200, from among recommended locations pre-stored in the electronic device 100, as the target location, based on the obtained spectrum. The recommended location may include information about at least one experimentally predetermined location. For example, the recommended location may include information about a critical distance (for example, within 2 m) and a critical angle (for example, within 30°) from the wireless power receiver 110. When the electronic device 100 receives wireless power at a reception ratio equal to or greater than a threshold, the recommended locations may include information indicating a location of the wireless power transmission device 200.

The embodiments of FIGS. 6, 7, and 9 are applicable to a method in which the electronic device 100 determines the target location from among the recommended locations of the wireless power transmission device 200, and thus a detailed description of the method will be omitted.

The target location may be determined considering physical objects existing in a space where the electronic device 100 is located. For example, the electronic device 100 may identify physical objects (for example, a sofa, a table, and a sound bar) located around the wireless power transmission device 200, by analyzing different frequency components included in the obtained spectrum. Alternatively, the electronic device 100 may identify the physical objects existing in the space where the electronic device 100 is located, based on an image captured via an image sensor. The electronic device 100 may correct the target location in consideration of the physical objects. For example, when a table exists at the target location, the electronic device 100 may correct the target location to above the table.

The electronic device 100 may generate a user interface that guides a location movement from the current location of the wireless power transmission device 200 to the target location. For example, the electronic device 100 may provide a user interface including at least one image for guiding a change in the location of the wireless power transmission device 200. In detail, the electronic device 100 may provide a user interface including at least one of an image representing the current location of the wireless power transmission device 200, an image representing the target location of the wireless power transmission device 200, and a guide image indicating a movement direction for moving the current location of the wireless power transmission device 200 to the target location.

The electronic device 100 may provide a user interface including a text representing a wireless power reception ratio. The wireless power reception ratio may be updated as the wireless power transmission device 200 moves. The electronic device 100 may provide a user interface including the above-described at least one image and a text representing a reception ratio.

The embodiments of FIGS. 8, 10, and 11 are applicable to a method performed by the electronic device 100 to provide a user interface, and thus a detailed description of the method will be omitted.

When the wireless power reception ratio from the wireless power transmission device 200 becomes less than a threshold, the electronic device 100 may automatically execute the user interface. For example, the electronic device 100 may interrupt execution of an application or a program and may automatically execute a user interface for guiding a location movement of the wireless power transmission device 200.

Alternatively, when a movement (for example, a movement by a user) of the wireless power transmission device 200 is sensed, the electronic device 100 may automatically provide a user interface in order to guide the wireless power transmission device 200 to move to an appropriate location.

When the wireless power transmission device 200 is moved to the target location, the electronic device 100 may terminate the user interface. The electronic device 100 may terminate the user interface and may re-execute an application (or a program) that has been previously executed.

FIG. 16 is a flowchart of a method in which the electronic device 100 provides a user interface by using an image sensor, according to an embodiment.

Referring to FIG. 16, in operation S1610, the electronic device 100 may receive wireless power from the wireless power transmission device 200.

In operation S1620, the electronic device 100 may determine whether a reception ratio of the wireless power received by the electronic device 100 relative to the wireless power transmitted by the wireless power transmission device 200 is less than a threshold (for example, 80%).

When the reception ratio is less than the threshold, in operation S1630, the electronic device 100 may determine the current location of the wireless power transmission device, based on images captured by a plurality of image sensors.

The electronic device 100 may generate a 3D image corresponding to a 3D space in which the electronic device 100 is located, by using the images captured by the plurality of image sensors. Alternatively, the electronic device 100 may obtain a 3D image by using a 3D image sensor.

In operation S1640, the electronic device 100 may provide a user interface for guiding a location movement from the current location of the wireless power transmission device 200 to the target location. For example, the electronic device 100 may provide a 3D user interface including images representing objects existing in the space where the electronic device 100 is located, based on the obtained 3D image. The embodiment of FIG. 11 is applicable to a method in which the electronic apparatus 100 provides the 3D user interface, and thus a detailed description of the method will be omitted.

When the reception ratio is greater than the threshold in operation S1620, the electronic device 100 may continue a currently-being-executed application or program.

FIG. 17 is a flowchart of a method in which the electronic device 100 provides a user interface, according to another embodiment.

Referring to FIG. 17, in operation S1710, the electronic device 100 may receive wireless power from the wireless power transmission device 200.

In operation S1720, the electronic device 100 may determine whether a reception ratio of the wireless power received by the electronic device 100 relative to the wireless power transmitted by the wireless power transmission device 200 is less than a threshold (for example, 80%).

When the reception ratio is less than the threshold, in operation S1730, the electronic device 100 may provide a user interface for guiding a location movement from the current location of the wireless power transmission device 200 to the target location. In this case, the electronic device 100 may provide a user interface including a text representing a current reception ratio.

In operation S1740, when the electronic device 100 senses a movement of the wireless power transmission device 200, the electronic device 100 may display an updated reception ratio.

In operation S1750, the electronic device 100 may determine whether the wireless power transmission device 200 has been moved to the target location. For example, as the wireless power transmission device 200 is moved, the electronic device 100 may update a spectrum of a frequency of a magnetic field. The electronic device 100 may determine whether a point representing the center of the wireless power transmission device 200 is located within the target range 620 of FIG. 6 within the spectrum, based on the updated spectrum. A method of determining whether the wireless power transmission device 200 has been moved to the target location has been described above with reference to FIG. 6, and thus a detailed description thereof will be omitted.

When the wireless power transmission device 200 has been moved to the target location, the electronic device 100 may terminate the user interface, in operation S1760.

The above-described embodiments can be written as computer programs and can be implemented in general-use digital computers that execute the programs using a computer-readable recording medium.

Further, when a processor of a computer needs to communicate with any other remote computer or server in order to execute the above functions, the processor of the computer may further include information about how it may communicate with any other remote computer or server by using a communication module (e.g., a wired and/or wireless communication module) of the computer and/or information about which information or media it should transmit/receive for communication.

In addition, functional programs for accomplishing the disclosed embodiments and codes and code segments related to the functional programs can be easily construed or changed by programmers skilled in the art to which the disclosed embodiments pertain, by taking into account a system environment of computers that execute programs using a computer-readable recording medium.

Examples of the computer-readable recording medium include ROM, RAM, CD-ROMs, magnetic tapes, floppy discs, and optical data storage media.

The computer-readable recording medium can also be distributed over network coupled computer systems so that the computer readable code is stored and executed in a distributive manner. In this case, at least one of a plurality of distributed computers may execute some of the above functions and transmit the execution results to at least one of the other distributed computers, and the computer having received the results may also execute some of the above functions and provide the execution results to the other distributed computers.

Although it has been described above that all components constituting the disclosed embodiments are combined into one component or operate in a combined manner, the scope of the present disclosure is not necessarily limited to these embodiments. In other words, without departing from the scope of the present disclosure, all the components may also be selectively combined into at least one component and operate. Further, although each of all the components may be implemented as one independent hardware unit, some or all of the components may be selectively combined to be implemented as a computer program having a program module that performs some or all of the functions combined in one or more hardware units. Codes and code segments that constitute the computer program may be easily inferred by one of ordinary skill in the art. The computer program may be stored in a computer-readable storage medium and may be read and executed by computers to implement the above embodiments. Examples of the storage medium of the computer program may include a magnetic recording medium and an optical recording medium.

While the present disclosure has been particularly shown and described above with reference to embodiments thereof, it will be understood by those skilled in the art that various changes in form and details may be made therein without departing from the spirit and scope of the present disclosure as defined by the appended claims. The disclosed embodiments should be considered in descriptive sense only and not for purposes of limitation. The scope of the present disclosure according to the disclosed embodiments is defined not by the detailed description of the present disclosure but by the appended claims, and all technical spirits within the scope will be construed as being included in the present disclosure according to the disclosed embodiments.

The invention claimed is:

1. An electronic device comprising:
   a wireless power receiver configured to receive wireless power from a wireless power transmission device;
   a display;
   a sensor; and
   a processor configured to:
      obtain a reception ratio of wireless power received by the wireless power receiver relative to wireless power transmitted by the wireless power transmission device,
      compare the obtained reception ratio of wireless power and a threshold,
      based on a result of the comparing, identify whether the reception ratio of wireless power is lower than the threshold,
      obtain, via the sensor, a location of the wireless power transmission device when the reception ratio of wireless power is lower than the threshold,
      determine a target location of the wireless power transmission device that is for increasing the reception ratio based on a location of the wireless power receiver and a location of the sensor,
      based on the location of the wireless power transmission device and the target location of the wireless power transmission device, automatically execute, via the display, a user interface that guides a location movement of the wireless power transmission device from the location of the wireless power transmission device to the target location of the wireless power transmission device,
      identify, via the sensor, a movement of the wireless power transmission device,
      identify whether the wireless power transmission device is moved to the target location based on the movement of the wireless power transmission device, and
      terminate, via the display, the execution of the user interface when the wireless power transmission device is moved to the target location.

2. The electronic device of claim 1, wherein the processor is further configured to determine the target location based on a spectrum of a predetermined frequency received from the wireless power transmission device.

3. The electronic device of claim 1, wherein the processor is further configured to determine the target location based on physical objects existing in a space where the electronic device is located.

4. The electronic device of claim 1, wherein
   the sensor comprises at least one image sensor, and
   the processor is further configured to obtain the location of the wireless power transmission device and the target location of the wireless power transmission device, based on at least one image captured by the at least one image sensor.

5. The electronic device of claim 1, wherein the user interface comprises at least one image for guiding a change in the location of the wireless power transmission device.

6. The electronic device of claim 5, wherein the at least one image comprises at least one of an image representing the location of the wireless power transmission device, an image representing the target location of the wireless power transmission device, and a guide image indicating a movement direction for moving the wireless power transmission device from the location of wireless power transmission device to the target location.

7. The electronic device of claim 1, wherein
   the user interface comprises text representing the reception ratio, and
   the processor is further configured to update the reception ratio based on the movement of the wireless power transmission device.

8. The electronic device of claim 1, wherein the wireless power receiver receives, from the wireless power transmission device, information about the wireless power transmitted by the wireless power transmission device.

9. The electronic device of claim 1, wherein
   the wireless power transmission device transmits electromagnetic wave energy of a predetermined frequency to the electronic device, and
   the wireless power receiver receives the electromagnetic wave energy by making a frequency transmitted by the wireless power transmission device identical to a resonance frequency of the wireless power receiver.

10. The electronic device of claim 1, wherein the wireless power transmission device is included in a sound bar that is in communication with the electronic device.

11. A method, performed by an electronic device, of providing a user interface, the method comprising:
   receiving, via a wireless power receiver of the electronic device, wireless power from a wireless power transmission device;
   obtaining, by a processor of the electronic device, a reception ratio of wireless power received by the electronic device relative to wireless power transmitted by the wireless power transmission device;

comparing, by the processor, the obtained reception ratio of wireless power and a threshold;

based on a result of the comparing, identifying whether the reception ratio of wireless power is lower than the threshold;

obtaining, via a sensor of the electronic device, a location of the wireless power transmission device when the reception ratio of wireless power is lower than the threshold;

determining, by the processor, a target location of the wireless power transmission device that is for increasing the reception ratio based on a location of the wireless power receiver and a location of the sensor, based on the location of the wireless power transmission device and the target location of the wireless power transmission device, automatically executing, by the processor via a display of the electronic device, a user interface that guides a location movement of the wireless power transmission device from the location of the wireless power transmission device to the target location of the wireless power transmission device, identifying, via the sensor, a movement of the wireless power transmission device, identifying, by the processor, whether the wireless power transmission device is moved to the target location based on the movement of the wireless power transmission device, and terminating, by the processor via the display, the execution of the user interface when the wireless power transmission device is moved to the target location.

12. The method of claim 11, wherein the target location is determined based on a spectrum of a predetermined frequency received from the wireless power transmission device.

13. The method of claim 11, wherein the target location is determined based on physical objects existing in a space where the electronic device is located.

14. The method of claim 11, wherein the location of the wireless power transmission device and the target location of the wireless power transmission device are determined based on at least one image captured by at least one image sensor included in the sensor.

15. The method of claim 11, wherein the user interface comprises at least one image for guiding a change in the location of the wireless power transmission device.

16. The method of claim 15, wherein the at least one image comprises at least one of an image representing the location of the wireless power transmission device, an image representing the target location of the wireless power transmission device, and a guide image indicating a movement direction for moving the wireless power transmission device from the location of the wireless power transmission device to the target location.

17. The method of claim 11, wherein the user interface comprises text representing the reception ratio, and the method further comprises updating the reception ratio based on the movement of the wireless power transmission device.

* * * * *